United States Patent
Wei

(10) Patent No.: US 11,760,019 B2
(45) Date of Patent: Sep. 19, 2023

(54) 3D PRINTING PEN AND USE METHOD THEREFOR

(71) Applicant: JIANGSU HAOYU ELECTRONIC TECHNOLOGY CO., LTD, Jurong (CN)

(72) Inventor: Honghui Wei, Jurong (CN)

(73) Assignee: JIANGSU HAOYU ELECTRONIC TECHNOLOGY CO., LTD, Jurong (CN)

( * ) Notice: Subject to any disclaimer, the term of this patent is extended or adjusted under 35 U.S.C. 154(b) by 25 days.

(21) Appl. No.: 17/358,627

(22) Filed: Jun. 25, 2021

(65) Prior Publication Data

US 2022/0305732 A1    Sep. 29, 2022

(30) Foreign Application Priority Data

| Mar. 29, 2021 | (CN) | ......................... 202110334979.6 |
| Mar. 29, 2021 | (CN) | ......................... 202110335875.7 |
| Mar. 29, 2021 | (CN) | ......................... 202120632549.8 |
| Mar. 29, 2021 | (CN) | ......................... 202120632550.0 |
| Mar. 29, 2021 | (CN) | ......................... 202120632557.2 |
| Mar. 29, 2021 | (CN) | ......................... 202120632558.7 |
| Mar. 29, 2021 | (CN) | ......................... 202120633455.2 |
| Mar. 29, 2021 | (CN) | ......................... 202120638534.2 |
| Mar. 29, 2021 | (CN) | ......................... 202120638790.1 |

(51) Int. Cl.
| *B29C 64/314* | (2017.01) |
| *B33Y 10/00* | (2015.01) |
| *B33Y 30/00* | (2015.01) |
| *B29C 64/321* | (2017.01) |
| *B29C 64/227* | (2017.01) |
| *B29C 64/118* | (2017.01) |
| *B33Y 40/10* | (2020.01) |

(52) U.S. Cl.
CPC .......... *B29C 64/314* (2017.08); *B29C 64/118* (2017.08); *B29C 64/227* (2017.08); *B29C 64/321* (2017.08); *B33Y 10/00* (2014.12); *B33Y 30/00* (2014.12); *B33Y 40/10* (2020.01); *B29K 2995/002* (2013.01)

(58) Field of Classification Search
CPC ... B29C 64/314; B29C 64/118; B29C 64/227; B29C 64/321; B33Y 30/00
See application file for complete search history.

(56) References Cited

FOREIGN PATENT DOCUMENTS

| CN | 104786502 A | * | 7/2015 |
| CN | 110682538 A | * | 1/2020 |

\* cited by examiner

*Primary Examiner* — Joseph S Del Sole
*Assistant Examiner* — Mohamed K Ahmed Ali
(74) *Attorney, Agent, or Firm* — HAUPTMAN HAM, LLP

(57) ABSTRACT

The present description discloses a 3D printing pen and a use method therefor. A pen body comprises a nozzle and a filament feeding channel through which a filament passes is formed in the pen body. The pen body further comprises a dyeing mechanism, wherein the dyeing mechanism includes a driving mechanism and a dyeing member, and the driving mechanism configured to drive the dyeing member to dye the filament; a filament feeding mechanism configured to convey the filament to the nozzle; a heating element configured to heat and melt the filament; and a stirring mechanism configured to stir the molten filament.

9 Claims, 17 Drawing Sheets

3D PRINTING PEN AND USE METHOD THEREFOR

RELATED APPLICATIONS

The present application claims priority from Chinese Application Numbers 202110334979.6, 202110335875.7, 202120632549.8, 202120632550.0, 202120632557.2, 202120633455.2, 202120632558.7, 202120638790.1, and 202120638534.2, all filed on Mar. 29, 2021, the disclosures of which are hereby incorporated by reference herein in their entireties.

TECHNICAL FIELD

The present description relates to the field of 3D printing technologies, and in particular, to a 3D printing pen and a use method therefor.

BACKGROUND

With the development of science and technology, 3D printing technologies are universally applied to various fields. Moreover, 3D printing technologies also appear in the life of people in the form of various types of products, such as 3D printing pens. Unlike a 3D printer in which a mechanical arm drives movement of a printing nozzle to achieve 3D printing, a 3D printing pen is controlled by a human hand, and the 3D printing pen may achieve 3D drawing according to willingness of a person. That is to say, a user may draw a 3D pattern in a 3D environment only with a conventional drawing pen. Presently, 3D printing pens employ a hot-melt deposition technology, and ink of 3D printing pens employs a hot-melting material, such as a PLA (polylactic acid) material or an ABS (acrylonitrile-butadiene-styrene copolymer) material, which is generally also referred to as a filament. During use, the hot-melting material in the 3D printing pen is extruded from a pen point after being heated, and then, the hot-melting material is cooled to form a 3D drawing pattern.

During use of the existing 3D printing pens, multiple filaments with different colors may be simultaneously inserted in a housing, but different filaments cannot be simultaneously subjected to hot-melt color mixing, the color is single, and multiple colors cannot be mixed for use.

Moreover, the existing 3D printing pens typically only employ a monochrome filament, and in the drawing process, a user needs to add filaments with different colors to the printing pen during color changing to realize color switching. Therefore, the existing 3D printing pens have the following defects: on one hand, the color is single, and the use process is tedious; on the other hand, filaments with different colors are frequently replaced, and thus the use is inconvenient.

In addition, the existing 3D printing pens includes a printing pen body; a first stepping motor is disposed at the top of an inner cavity of the printing pen body, and a support is fixedly provided at the bottom of the first stepping motor; a second stepping motor is disposed at the bottom of the support; an L-bar is connected to a bottom end of the second stepping motor, and a pressure air pump is disposed at the bottom of the second stepping motor; cartridge groups are disposed at the bottom of the pressure air pump, and a stirring guide rod is disposed between the cartridge groups; the stirring guide rod penetrates through the pressure air pump to be connected to the second stepping motor; and a pressure valve switch is disposed at one side of the top of each of the cartridge groups, and the pressure valve switch is engaged with a tail end of the L-bar. During use, feeding is controlled mainly by the first stepping motor, and the stirring process is controlled by the second stepping motor. Therefore, on one hand, since double driving is used as a driving force during use, the problem of relatively large energy consumption exists; on the other hand, since two driving sources are disposed in the printing pen body, the overall size is large and it is inconvenient for the user to hold.

The existing 3D printing pens each use a driving gear to drive a printing filament to be conveyed, and the driving gear and a roller cooperate to keep the conveying stability of the printing filament. In the process of driving the filament to be fed by the driving gear, the filament may rotate. However, since the filament in the 3D printing pen is integrated with the external remaining filament roll, the rotation of the filament in the 3D printing pen may also drive the external filament to rotate together, thereby causing winding of the external filament and thus affecting feeding and the operation of the user.

In addition, existing automatic coloring 3D printing cartridges includes a cartridge body; a filament hole runs through an axial direction of the cartridge body; the cartridge body comprises a primary color region and a color mixing region; the primary color region comprises three color mixing boxes for placing dye powder; coloring holes communicated with the filament hole are formed in a primary color box and the color mixing box facing one side of the filament hole; a plurality of air inlet holes which are respectively communicated with the primary color box and the color mixing boxes are formed in the outer side wall of the cartridge body; a driving cylinder rotating around the cartridge body is disposed in a circumferential direction of the cartridge body; a nozzle capable of supplying air into the air inlet holes is formed in the inner side of the driving cylinder, and the nozzle rotates around the cartridge body along with the driving cylinder; and a one-way door capable of being propped open by the nozzle and capable of being automatically reset is hinged to the air inlet holes. According to the arrangement in the present description, the printing operation is not required to be interrupted to add or replace a linear filament of a corresponding color, and therefore, it is convenient to use while ensuring the continuity of the printing operation.

The existing 3D printing pens are complicated in structure, the dye powder in the cartridge may be sprayed onto the linear filament only by blowing air into the cartridge, and the dye powder easily stains the other structures of the device in the spraying process, and thus damages the cleanliness of the device. Moreover, the existing 3D printing pens may only dye a color consistent with the color of the ink during dyeing, the coloring concentration cannot be controlled, and the color of a printed product is single and the operability is poor.

SUMMARY

The purpose of the present description is to provide a 3D printing pen, which employs the approach of dyeing a filament and has the effects of being rich in colors, strong in interestingness, flexible, diversified and uniform in dyeing. Another purpose of the present description is to provide a use method for the 3D printing pen, which has the effect of being more convenient to use.

The technical purposes of the present description are achieved through the following technical solutions:

a 3D printing pen includes a pen body, the pen body comprises a nozzle, and a filament feeding channel, through the filament feeding channel a filament passes, wherein the pen body further comprises a filament feeding mechanism, configured to convey the filament to the nozzle; and a dyeing mechanism configured to dye the filament, the dyeing mechanism including a driving mechanism and a dyeing member connected to the driving mechanism, and the driving mechanism is configured to drive the dyeing member to dye the filament.

The 3D printing pen in the present description further comprises a heating element for heating and melting the filament, and a stirring mechanism for stirring the molten filament.

By adoption of the technical solution, during use, the filament is first conveyed into the filament feeding channel of the pen body; after a power supply component is energized, the driving mechanism drives the dyeing member to dye the side wall of the filament, and the filament feeding mechanism drives the dyed filament to be conveyed to the stirring mechanism; after the dyed filament extends into the stirring mechanism, the heating element heats the solid color filament in the stirring mechanism to enable same to be melted; then, the stirring mechanism stirs the molten filament, and a front end of the filament drives the molten color filament to be extruded from the nozzle while the filament feeding mechanism drives the filament to move to the stirring mechanism, thereby realizing 3D drawing; and through cooperation of multiple groups of dyeing mechanisms, various colors may be dyed on the filament. Therefore, the printing pen has the effects of being rich in colors, strong in interestingness, flexible, diversified and uniform in dyeing.

Further, in the present description, the pen body further comprises a color changing rotary disc, the color changing rotary disc controls the dyeing mechanism, and the color changing rotary disc is configured to control the driving mechanism to switch the dyeing member.

By adoption of the technical solution, a user may control different groups of dyeing mechanisms to realize color changing by rotating the color changing rotary disc, and the user may select different colors to dye the filament according to preferences of the user. Therefore, without replacing the filament, multi-color conversion may be realized on the same filament, filaments with different colors do not need to be purchased, and the cost is low.

Further, in the present description, the driving mechanism includes a sliding block, and the sliding block moves in a direction close to the dyeing member such that the dyeing member is close to the filament.

By adoption of the technical solution, when the filament is dyed, the sliding block moves in a direction close to the corresponding dyeing member until the dyeing member is attached to the side wall of the filament; and after the dyeing is completed, the sliding block is reset, so that the dyeing member is far away from the filament.

Further, in the present description, the driving mechanism further includes a color changing motor, and an eccentric wheel disc disposed on an output end of the color changing motor; the eccentric wheel disc includes an eccentric column, the sliding block comprises a strip-shaped groove, and the eccentric column is configured to embed with the strip-shaped groove and move with the strip-shaped groove; and a sliding groove is disposed in the pen body, wherein the sliding block is configured to slide within the sliding groove.

By adoption of the technical solution, after the color changing motor is started, the eccentric wheel disc is driven to rotate, and when the eccentric wheel disc rotates, under the cooperation of the eccentric column and the strip-shaped groove, the sliding block moves towards or away from the corresponding dyeing member along the corresponding sliding groove, so that the sliding block drives the corresponding dyeing member.

Further, in the present description, a driving component is disposed in the pen body; a first transmission assembly is disposed between the driving component and the filament feeding mechanism, and a second transmission assembly is disposed between the driving component and the stirring mechanism; and the driving component synchronously acts on the filament feeding mechanism and the stirring mechanism.

By adoption of the technical solution, during use, after the driving component is started, the driving component drives the filament feeding mechanism to move through the first transmission assembly, and the filament feeding mechanism conveys the filament to the nozzle; in addition, the driving component drives the stirring mechanism to synchronously move through the second transmission assembly, and the stirring mechanism stirs and uniformly mixes the molten filament. Therefore, filament feeding and stirring processes are synchronously carried out, discharging while stirring is realized, and the probability of a material breaking phenomenon is reduced. In addition, on one hand, use of a single-drive double-output approach has the effects of saving energy and reducing power; on the other hand, the printing pen also has a more compact structure in terms of the overall layout, and is convenient for the user to hold.

Further, in the present description, the first transmission assembly includes a first reversing gear, the second transmission assembly includes a stirring transmission gear, and both the first reversing gear and the stirring transmission gear are coaxially disposed at an output end of the driving component.

By adoption of the technical solution, after the driving component is started, the output end simultaneously drives the first reversing gear and the stirring transmission gear to rotate, so that the same driving component may simultaneously realize double output through the first transmission assembly and the second transmission assembly.

Further, in the present description, the filament feeding mechanism includes a filament feeding gear set, the filament feeding gear set includes a filament feeding driving gear and a filament feeding driven wheel, a filament feeding channel is formed between the filament feeding driving gear and the filament feeding driven wheel, and the filament feeding driving gear comprises a rotating shaft; and the first transmission assembly further includes a second reversing gear disposed on the rotating shaft, and the second reversing gear is configured to mesh with the first reversing gear.

By adoption of the technical solution, the filament is fed into the filament feeding channel, and the filament feeding driving gear and the filament feeding driven wheel are located on the two sides of the filament, respectively, and generate a certain clamping force on the side wall of the filament; when the first reversing gear rotates, the second reversing gear is driven to rotate, and the second reversing gear drives the filament feeding driving gear to rotate through the rotating shaft; and since the side wall of the filament is attached to the side wall of the filament feeding driving gear, when the filament feeding driving gear rotates, the filament feeding driving gear cooperates with the filament feeding driven wheel to convey the filament.

Further, in the present description, the stirring mechanism includes a stirring tube in which the filament is fed, and the stirring tube is rotatably disposed in the pen body; and a stirring cavity is formed in the nozzle, and the stirring tube is communicated with the stirring cavity.

By adoption of the technical solution, the filament whose side wall is dyed with multiple colors fed into the stirring tube, a front end of the filament extends into the stirring cavity, and the heating element generates heat to heat and melt the color filament in the stirring cavity; after the driving component is started, the stirring tube is driven to rotate, so that the stirring tube stirs and mixes the molten color filament in the stirring cavity, and the filaments with different colors are uniformly stirred; and the color filament may also be driven to move towards the nozzle during stirring, and the uniformly stirred color filament in the stirring cavity may be extruded from the nozzle in the driving process, so that multi-color mixing may be realized during use, and after stirring, the mixed color is uniform, and the color texture is good.

Further, in the present description, the filament feeding mechanism includes an anti-rotation structure, and the anti-rotation structure limits the filament passing through the filament feeding channel to limit rotation of the filament.

Further, in the present description, the second transmission assembly further includes a connection sleeve, and a stirring tube gear coaxially provided on the connection sleeve, the stirring tube gear is meshed with the stirring transmission gear, and the connection sleeve is coaxially sleeved on the stirring tube.

By adoption of the technical solution, since the heating element heats the stirring cavity, the connection sleeve is connected to a rear end of the stirring tube, and the connection sleeve and the stirring tube are separately configured into two components, the filament may be prevented from melting and softening in advance due to the heat conduction of the stirring tube to some extent before entering into the stirring cavity. After the connection sleeve is employed for certain thermal insulation, the filament may be conveniently pushed into, and the filament feeding gear set is prevented from slipping and gnawing.

The present description further provides a 3D printing pen having a dyeing mechanism, including a pen body; and the pen body is provided with multiple groups of dyeing mechanisms, the dyeing mechanism including a driving mechanism and a dyeing member, and the driving mechanism driving the dyeing member to dye the filament; when the dyeing member is attached to the filament, the filament being dyed, and after the filament is dyed, the dyeing member being far away from the filament; and a color changing control member, configured to control the one or more dyeing mechanisms and configured to control switching of different dyeing mechanisms.

By adoption of the technical solution, during dyeing, the driving mechanism is started to drive the dyeing member to be close to the filament, so that the surface of the filament may be dyed; during use, the filament may be dyed by using a group of dyeing mechanisms or two or more groups of dyeing mechanisms, when a group of dyeing mechanism are used for dyeing, the color is a primary color of the dyeing member, and when multiple groups of dyeing mechanisms are used for dyeing, the color is a mixed color of the dyeing members. Color changing of different groups of dyeing mechanisms may be realized by adjusting the color changing control member. The user may select different colors to dye the filament according to preferences of the user. Therefore, without replacing the filament, multi-color conversion may be realized on the same filament. The printing pen has the effects of being rich in colors, strong in interestingness, flexible in use, diversified and uniform in dyeing. Filaments with different colors do not need to be purchased, and the cost is low.

Further, in the present description, the color changing control member is configured to be a color changing rotary disc, a plurality of position identifiers are provided on the color changing rotary disc, and a positioning identifier is provided on the pen body. When the color changing rotary disc is rotated, one of the position identifiers corresponds to the positioning identifier.

By adoption of the technical solution, when the color to be dyed of the filament is replaced, the color changing rotary disc is rotated, and when different position identifiers correspond to the positioning identifier, the driving mechanism controlling the dyeing member with different colors may be started, and the user may conveniently perform selection and switching intuitively.

Further, in the present description, the dyeing member is configured to be the dyeing rod, an arc-shaped recess is formed in an end face of the sliding block close to the corresponding dyeing rod, and the arc-shaped recess fits the dyeing rod.

By adoption of the technical solution, when the sliding block drives the corresponding dyeing rod to be close to the filament, the dyeing rod is correspondingly embedded in the arc-shaped recess. When the sliding block drives the corresponding dyeing rod, the arc-shaped recess has a good limiting effect on the dyeing rod to a certain extent and prevents the dyeing rod from being separated from the sliding block.

Further, in the present description, the pen body is provided with a support, and a through hole through which the filament passes is formed in the center of the support; the sliding grooves are distributed around the through hole, and the sliding grooves are communicated with the through hole; and one or more anti-shake ribs are provided in the through hole.

By adoption of the technical solution, when the filament is fed into the through hole, the anti-shake ribs abut against the side wall of the filament, so that the filament may be prevented from shaking in the feeding and dyeing process to a certain extent, the dyeing is uniform, and the dyeing effect is better.

Further, in the present description, there are at least two groups of dyeing mechanisms.

By adoption of the technical solution, by arranging multiple groups of dyeing mechanism, different dyeing members may be used for color mixing, thereby realizing color diversification and enhancing interestingness of the user during use.

The present description further provides a 3D printing pen having a stirring mechanism, which has the effects of uniform color mixing and convenient use.

The present description provides a 3D printing pen having a stirring mechanism, including a pen body; and the pen body is provided with a stirring tube, configured to allow the filament to pass, and rotatably provided in the pen body;

a driving component, configured to drive the stirring tube to rotate;

a nozzle, a stirring cavity in which the stirring tube extends being formed in the nozzle, and the stirring tube being communicated with the stirring cavity; and a heating element, configured to heat the filament in the stirring cavity.

By adoption of the technical solution, the filament whose side wall is dyed with multiple colors or multiple color filaments are fed into the stirring tube, a front end of the filament extends into the stirring cavity, and the heating element generates heat to heat and melt the color filament in the stirring cavity; after the driving component is started, the stirring tube is driven to rotate, so that the stirring tube stirs and mixes the molten color filament in the stirring cavity, and the filaments with different colors are uniformly stirred; and the color filament may be driven to move towards the nozzle during stirring, and the uniformly stirred color filament in the stirring cavity may be extruded from the nozzle in the driving process, so that multi-color mixing may be realized during use, and after stirring, the mixed color is uniform, and the color texture is good. Compared with the method the prior art that one or more color filaments are sequentially switched for use, the present description further has the effect of being more convenient to change colors.

By adoption of the technical solution, when the filament is extruded from the front end of the stirring tube, the stirring tube may rapidly stir the molten filament.

Further, in the present description, the driving component includes a driving motor, and a transmission assembly, and the driving motor drives the stirring tube to rotate through the transmission assembly.

Further, in the present description, the transmission assembly includes a stirring transmission gear and a stirring tube gear in meshing transmission, the stirring transmission gear is fixedly connected to an output end of the driving motor, and the stirring tube gear is coaxially provided on the stirring tube.

By adoption of the technical solution, after the driving motor is started, the output end drives the stirring transmission gear to rotate, and under the meshing effect of the stirring transmission gear and the stirring tube gear, the stirring tube gear rotates, and meanwhile, the stirring tube is driven to rotate.

Further, in the present description, the transmission assembly includes a stirring transmission gear, a connection sleeve, and a stirring tube gear coaxially provided on the connection sleeve, the stirring tube gear is meshed with the stirring transmission gear, and the connection sleeve is sleeved on the stirring tube.

By adoption of the technical solution, since the heating element heats the stirring cavity, and the connection sleeve and the stirring tube are separately configured into two components, the filament may be prevented from melting and softening in advance due to the heat conduction of the stirring tube integrated therewith to some extent before entering into the stirring cavity. After the split-type connection sleeve is employed for certain thermal insulation, the filament may be conveniently pushed into.

Further, in the present description, the connection sleeve is configured as a plastic connection sleeve, and the stirring tube is a heat transfer stirring tube.

By adoption of the technical solution, when the heating element heats the filament, since the heat transfer stirring tube has good thermal conductivity, the filament in the stirring cavity may be rapidly melt. However, when the plastic connection sleeve is connected to the rear end of the stirring tube, since the thermal conductivity of the plastic is worse than that of the metal, and the connection sleeve and the stirring tube are separately configured into two components, the filament may be prevented from melting and softening in advance due to the heat conduction of the heat transfer stirring tube to some extent before entering into the stirring cavity. After the plastic connection sleeve is employed for certain thermal insulation, the filament may be conveniently pushed into.

Further, in the present description, an end portion of the connection sleeve is provided with a guiding inclined surface.

By adoption of the technical solution, when the filament is inserted into the connection sleeve, the arrangement of the guiding inclined surface facilitates guiding the filament into the connection sleeve, thereby realizing quick and accurate insertion.

Further, in the present description, the heating element is provided on the outer wall of the nozzle.

By adoption of the technical solution, the heating element is provided on the outer wall of the nozzle, and the overall heating of the side wall of the nozzle is uniform, so that the overall melting effect of the filament is good, and sufficient stirring is facilitated.

Further, in the present description, the inner wall of the nozzle is attached to the outer wall of the stirring tube to form an overlapping part, and the heating element corresponds to the overlapping part.

In some implementations, the present description provides a 3D printing pen capable of realizing stirring and filament feeding synchronization, including a pen body; a nozzle is provided at a front end of the pen body; and the pen body is provided with a filament feeding mechanism, configured to convey the filament to the nozzle;

a heating element, configured to melt the filament;

a stirring mechanism, configured to stir the molten filament in the pen body; and a driving component, a first transmission assembly being provided between the driving component and the filament feeding mechanism, and a second transmission assembly being provided between the driving component and the stirring mechanism; and the driving component synchronously acting on the filament feeding mechanism and the stirring mechanism.

By adoption of the technical solution, during use, after the driving component is started, the driving component drives the filament feeding mechanism to move through the first transmission assembly, the filament feeding mechanism conveys the filament to the nozzle, and the heating element heats the filament entering the nozzle to enable same to be melted; in addition, the driving component drives the stirring mechanism to synchronously move through the second transmission assembly, and the stirring mechanism stirs and uniformly mixes the molten filament. Therefore, filament feeding and stirring processes are synchronously carried out, the uniformly stirred molten filament may be extruded from the nozzle during the filament feeding process, discharging while stirring is realized, and the probability of a material breaking phenomenon is reduced. In addition, on one hand, use of a single-drive double-output approach has the effects of saving energy and reducing power; on the other hand, the printing pen also has a more compact structure in terms of the overall layout, and is convenient for the user to hold.

Further, in the present description, the first transmission assembly includes a first reversing gear, the second transmission assembly includes a stirring transmission gear, and both the first reversing gear and the stirring transmission gear are coaxially provided on an output end of the driving component.

By adoption of the technical solution, after the driving component is started, the output end simultaneously drives the first reversing gear and the stirring transmission gear to rotate, so that the same driving component may simultaneously realize double output through the first transmission assembly and the second transmission assembly.

Further, in the present description, the filament feeding mechanism includes a filament feeding gear set, the filament feeding gear set includes a filament feeding driving gear and a filament feeding driven wheel, a filament feeding channel is formed between the filament feeding driving gear and the filament feeding driven wheel, and the filament feeding driving gear is provided with a rotating shaft; and the first transmission assembly further includes a second reversing gear provided on the rotating shaft, and the second reversing gear is meshed with the first reversing gear.

By adoption of the technical solution, the filament is fed into the filament feeding channel, and the filament feeding driving gear and the filament feeding driven wheel are located on the two sides of the filament, respectively, and generate a certain clamping force on the side wall of the filament; when the first reversing gear rotates, the second reversing gear is driven to rotate, and the second reversing gear drives the filament feeding driving gear to rotate through the rotating shaft; and since the side wall of the filament is attached to the side wall of the filament feeding driving gear, when the filament feeding driving gear rotates, the filament feeding driving gear cooperates with the filament feeding driven wheel to convey the filament.

Further, in the present description, an annular embedding groove is formed in the side wall of the filament feeding driving gear.

By adoption of the technical solution, the arrangement of the annular embedding groove allows the side wall of the filament to be correspondingly embedded in the annular embedding groove, and the filament is limited in the circumferential direction, which allows linear filament feeding and limits rotation of the side wall, thereby preventing the fed filament from twisting and winding due to the stirring action of the stirring mechanism at the front end to a certain extent.

Further, in the present description, the second transmission assembly further includes a stirring tube gear, the stirring tube gear is provided on the stirring mechanism, and the stirring tube gear is meshed with the stirring transmission gear.

By adoption of the technical solution, when the stirring transmission gear rotates, the stirring tube gear may be driven to rotate along with the stirring transmission gear, so that the stirring mechanism is driven to realize the stirring process.

Further, in the present description, the stirring mechanism includes a stirring tube through which the filament penetrates, and the stirring tube is rotatably provided in the pen body; a stirring cavity in which the front end of the stirring tube extends is formed in the nozzle, and the stirring tube is communicated with the stirring cavity; and the driving component drives the stirring tube to rotate through the second transmission assembly.

The present description further provides a 3D printing pen having an anti-rotation structure for a filament, including:
 a printing pen body; and
 a filament feeding channel, the filament feeding channel being provided in the printing pen body for passing of the filament, and openings at two ends of the filament feeding channel being respectively a feeding port and a discharging port.

The filament feeding structure includes an anti-rotation mechanism, and the anti-rotation mechanism limits the filament passing through the filament feeding channel to limit rotation of the filament.

Further, the anti-rotation mechanism includes two anti-rotation ribs, an anti-rotation channel is formed between the anti-rotation ribs, the filament feeding channel is connected to the anti-rotation channel, and the anti-rotation ribs may be in contact fit with the filament passing through the anti-rotation channel, thereby limiting rotation of the filament.

Further, a feeding mechanism is provided in the printing pen body, the feeding mechanism includes a driving gear set for driving the filament to advance, the filament feeding channel runs through the driving gear set, and the anti-rotating ribs are provided on the driving gear set.

Further, the driving gear set includes a driving gear for driving the filament to advance and an auxiliary wheel for guiding the filament to move forward. The driving gear is a gear having a tooth pattern on the peripheral side, and the auxiliary wheel is a roller with a smooth peripheral side.

In the arrangement mode of one of the anti-rotation ribs, the anti-rotation rib is provided on the driving gear, an annular cutting groove is formed in the peripheral side of the driving gear, and the anti-rotation rib is formed by forming the annular cutting groove in the peripheral side of the driving gear.

In the arrangement mode of the other anti-rotation rib, the anti-rotation rib is provided on the auxiliary wheel, an annular cutting groove is formed in the peripheral side of the auxiliary wheel, and the anti-rotation rib is formed by forming the annular cutting groove in the peripheral side of the auxiliary wheel.

Another arrangement mode may be obtained by combining the two arrangement modes of the anti-rotation ribs, both the driving gear and the auxiliary wheel are provided with an anti-rotating rib, both the peripheral sides of the driving gear and the auxiliary wheel are provided with an annular cutting groove, and the anti-rotating ribs are formed by forming the annular cutting grooves in the peripheral sides of the driving gear and the auxiliary wheel.

In addition to the several arrangement modes of the anti-rotation ribs, there is another arrangement mode, that is, the anti-rotation rib is convexly provided on the inner wall of the filament feeding channel.

Further, for the structure of a dyeing mechanism, the dyeing mechanism includes a cartridge containing a dye and a coloring assembly capable of coating the dye in the cartridge to the surface of the filament.

Further, one or more ink reservoirs are provided in the cartridge, dyes with different colors are contained in the ink reservoirs, one or more rod-shaped dyeing members are also convexly provided on the cartridge, the dyes in the ink reservoir may permeate into the dyeing members, and the coloring assembly drives the dyeing member towards the filament feeding channel, so that the dye on the dyeing member is coated on the surface of the filament.

Further, the present description provides a use method for the 3D printing pen, including the following steps:
 S1: power-on: a power supply component supplies power to a power consumption component;
 S2: heating: a heating element is energized to generate heat;
 S3: loading of a filament: the filament is fed into a filament feeding channel in a pen body until the filament extends into a filament feeding mechanism;
 S4: dyeing: a driving mechanism is controlled by means of a color changing rotary disc to selectively drive a dyeing member to be close to the filament, and the dyeing mechanism performs dyeing on the filament extending into the filament feeding channel to form a required color filament;

S5: filament feeding and stirring: the filament feeding mechanism drives the filament to be fed, and the stirring mechanism stirs the dyed and heated and melted color filament; and S6: filament feeding and extrusion: the filament feeding mechanism drives the filament to move to a nozzle and drives the uniformly stirred molten color filament to be extruded from the nozzle.

By adoption of the technical solution, multiple colors may be dyed on the side wall of the filament; a user may freely select a color according to willingness of the user; and the dyed color filament is heated and stirred to form a colored molten filament with a uniform color and a good drawing effect, so that the printing pen has the effects of being convenient to use, low in cost and good in drawing effect.

Further, in the present description, S4 includes the following dyeing process:

S1: adjusting the color changing rotary disc to a first position where a first dyeing member and a second dyeing member do not perform dyeing, so that the molten filament extruded from the pen body is a natural color;

S2: adjusting a color changing control member to a second position where a first sliding block drives the first dyeing member to move, and the first dyeing member dyes the filament, so that the color of the molten filament extruded from the pen body is the color of the first dyeing member;

S3: adjusting the color changing control member to a third position where a second sliding block drives the second dyeing member to move, and the second dyeing member dyes the filament, so that the color of the molten filament extruded from the pen body is the color of the second dyeing member; and S4: adjusting the color changing control member to a fourth position where the first sliding block drives the first dyeing member to move, and the second sliding block drives the second dyeing member to move, so that the color of the molten filament extruded from the pen body is a mixed color of the first dyeing member and the second dyeing member; where S1, S2, S3, and S4 may be arbitrarily selected during use to achieve color changing.

In conclusion, the present description has the following beneficial effects:

by arranging the dyeing mechanism, the filament feeding mechanism, and the stirring mechanism in the pen body, the side wall of the transparent filament may be dyed to form a color filament, and the color filament is heated and melted and uniformly stirred by the stirring mechanism and then extruded from the nozzle to realize 3D drawing. Therefore, the printing pen has the effects of being rich in colors, strong in interestingness, flexible and diversified.

By adoption of a single-output double-drive approach, the stirring mechanism and the filament feeding mechanism are simultaneously driven by one driving component, so that the filament feeding and stirring processes are synchronously carried out. The filament feeding process may also extrude the uniformly stirred molten filament from the nozzle, discharging while stirring is realized, and the probability of a material breaking phenomenon is reduced. In addition, on one hand, use of a single-drive double-output approach has the effects of saving energy and reducing power; on the other hand, the printing pen also has a more compact structure in terms of the overall layout, and is convenient for the user to hold.

By separately arranging the connection sleeve and the stirring tube as two components, a certain thermal insulation effect may be achieved, and the filament is prevented from melting and softening in advance before entering the stirring cavity.

By adopting the method of dyeing the filament, hot-melting, stirring, and extruding the filament to achieve 3D drawing, the user may freely select a color according to willingness of the user; and the dyed color filament is heated and stirred to form a colored molten filament with a uniform color and a good drawing effect. Therefore, the printing pen has the effects of being convenient to use, low in cost and good in drawing effect.

By arranging the stirring tube in the pen body, the driving component drives the stirring tube to rotate, the heated and melted multi-color filament in the stirring cavity in the nozzle is stirred and mixed, and after stirring, the mixed color is uniform, and the color texture is good. Compared with the method the prior art that one or more color filaments are sequentially switched for use, the present description further has the effect of being more convenient to change colors.

Color changing of different groups of dyeing mechanisms may be realized by adjusting the color changing control member. The user may select different colors to dye the filament. Therefore, without replacing the filament, multi-color conversion may be realized on the same filament. The printing pen has the effects of being rich in colors, and strong in interestingness. Filaments with different colors do not need to be purchased, and the cost is low.

By arranging an arc-shaped recess in an end face of the sliding block, when the sliding block drives the corresponding dyeing member, a good limiting effect on the dyeing member may be realized to a certain extent and the dyeing member is prevented from being separated from the sliding block.

By arranging the anti-shake ribs in the through hole, the filament may be prevented from shaking in the feeding and dyeing process to a certain extent, the dyeing is uniform, and the dyeing effect is better.

By adopting the method in which color changing is controlled by the color changing rotary disc, the user may control, by adjusting the color changing control member, the side wall of the filament to be dyed with different colors, and has multiple selectivity, and color switching is convenient.

The arrangement of an annular embedding groove in the side wall of the filament feeding driving gear may prevent the fed filament from twisting and winding due to the stirring action of the stirring mechanism at the front end to a certain extent.

The anti-rotation mechanism is provided in the printing pen body and limits the filament, so as to ensure that the filament passing through the filament feeding channel do not rotate, effectively prevent the filament exposed outside the printing pen from winding, and avoid the influence of the winding of the filament on the feeding operation.

The present product is a color 3D printing pen, the printing pen body includes a cartridge provided with a dyeing member, and dyeing of the filament surface may be achieved through the contact between the dyeing member and the filament surface. Moreover, if the filament rotates in the filament feeding process, the dye coated on the filament surface may stain the dyeing member of another color along with the rotation of the filament, thereby causing color contamination. The arrangement of the anti-rotation mechanism may effectively prevent the color contamination between the dyeing members.

The printing pen body is provided with the dyeing mechanism, the heating mechanism, and the stirring mechanism. After the filament enters the filament feeding channel, the filament surface is first dyed by the dyeing mechanism, then the filament becomes a molten state under the heating of the heating mechanism, next, the filament in the molten state is fully mixed with the dye on the surface thereof under the stirring of the stirring mechanism, and finally, the filament extruded from an outlet has the corresponding color.

The dyeing mechanism includes the cartridge and the coloring assembly, the dyes with multiple colors are placed in the cartridge, and the dyeing members corresponding to the dyes are provided. The coloring assembly drives the dyeing members to the filament feeding channel to dye the filament surface. By combining different colors, after hot-melting stirring, various colors of filaments may be output, and color 3D creation may be more conveniently achieved.

Figure 1:
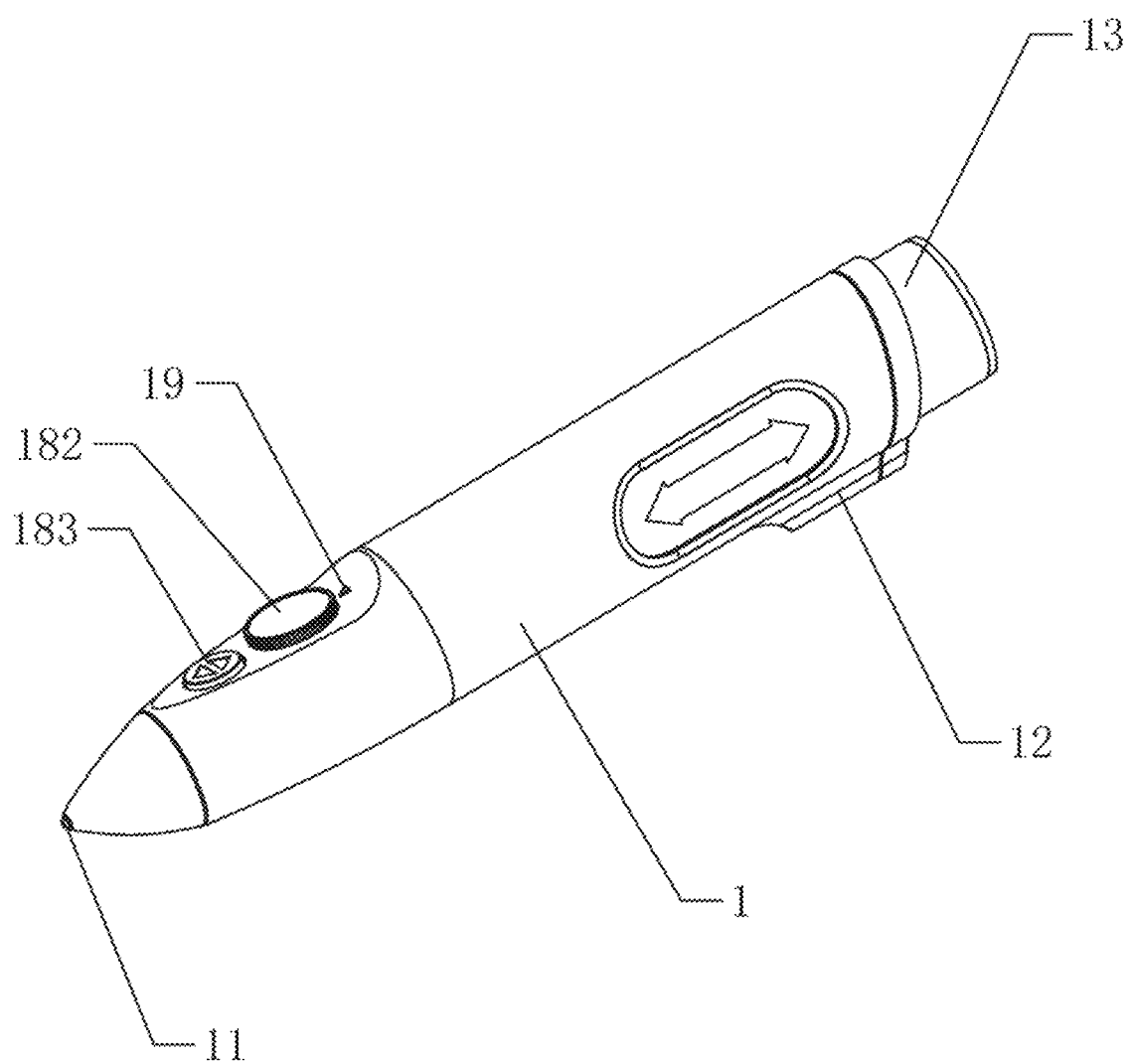
FIG. 1 is a schematic diagram of an overall structure according to an embodiment.

In the drawings: 1. pen body; 11. nozzle; 111. stirring cavity; 12. power socket; 13. cartridge; 131. ink reservoir; 132. ink storing unit; 133; ink outlet; 134. dyeing member; 1341. first dyeing member; 1342. second dyeing member; 1343. third dyeing member; 135. filament hole; 136. air hole; 14. support; 141. sliding groove; 142. through hole; 143. anti-shake rib; 15. pressing plate; 151. sensing element; 152. limiting insertion hole; 16, pressing block; 17. branch circuit board; 18. main circuit board; 181. indicator light; 182. color changing rotary disc; 183. filament feeding button; 184. color changing module; 19. positioning identifier; 2. dyeing mechanism; 21. color changing motor; 211. first color changing motor; 212. second color changing motor; 213. third color changing motor; 22. sliding block; 221. first sliding block; 222. second sliding block; 223. third sliding block; 224. strip-shaped groove; 225. arc-shaped recess; 226. magnetic element; 23. eccentric wheel disc; 231. eccentric column; 3. filament feeding mechanism; 31. filament feeding driving gear; 311. annular embedding groove; 312. rotating shaft; 314. anti-rotation rib; 32. filament feeding driven wheel; 33. filament feeding channel; 4. stirring mechanism; 41. heating element; 42. stirring tube; 5. mounting frame; 51. driving motor; 6. first transmission assembly; 61. first reversing gear; 62. second reversing gear; 7. second transmission assembly; 71. stirring transmission gear; 72. connection sleeve; 721. stirring tube gear; 722. guiding inclined surface; 8. filament.

DETAILED DESCRIPTION

The present description is further descried below in combination with the accompanying drawings.

Embodiment 1

Figure 2:
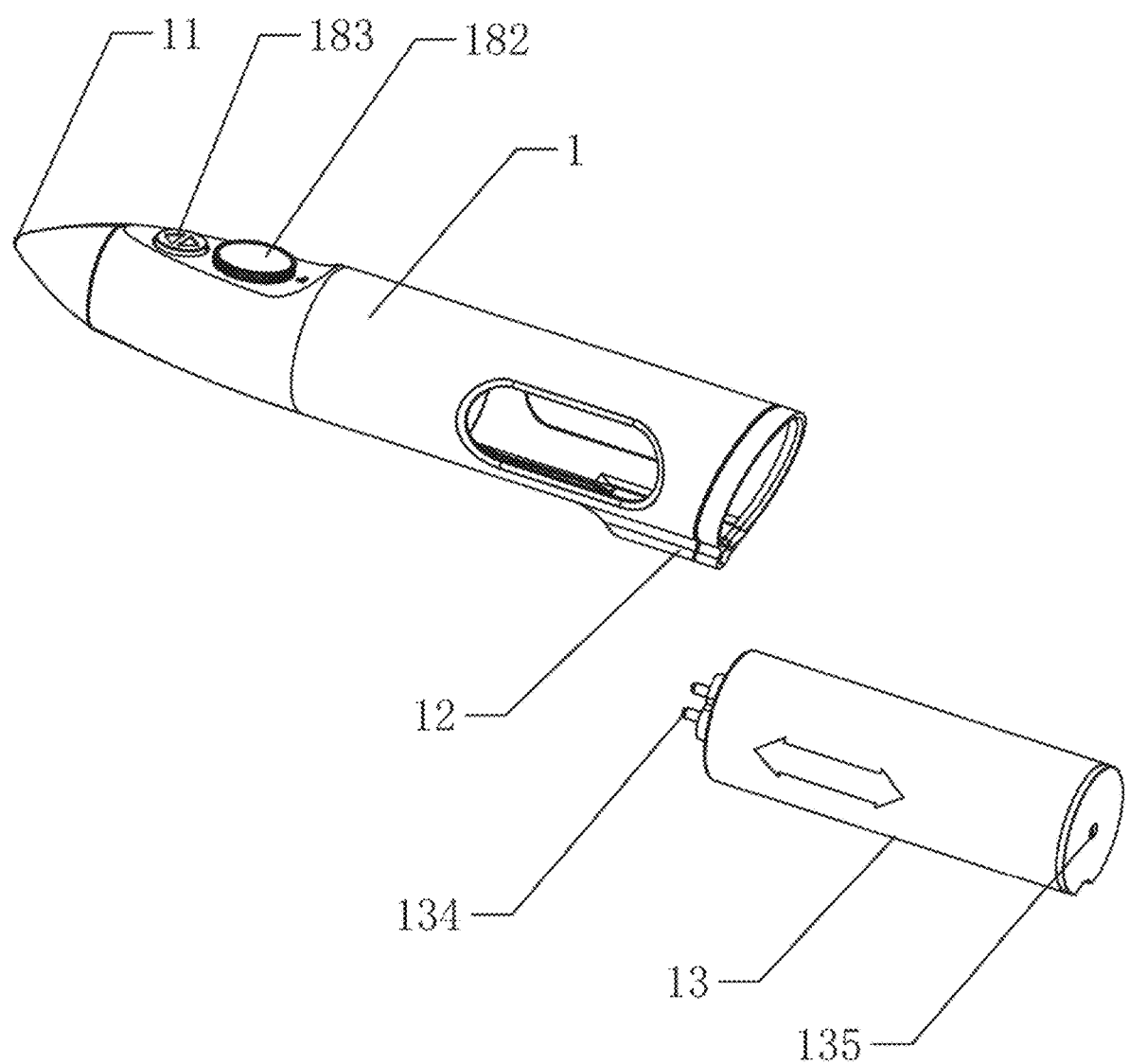
FIG. 2 is a schematic structural diagram of a cartridge and a pen body in a separated state according to an embodiment.
Figure 8:
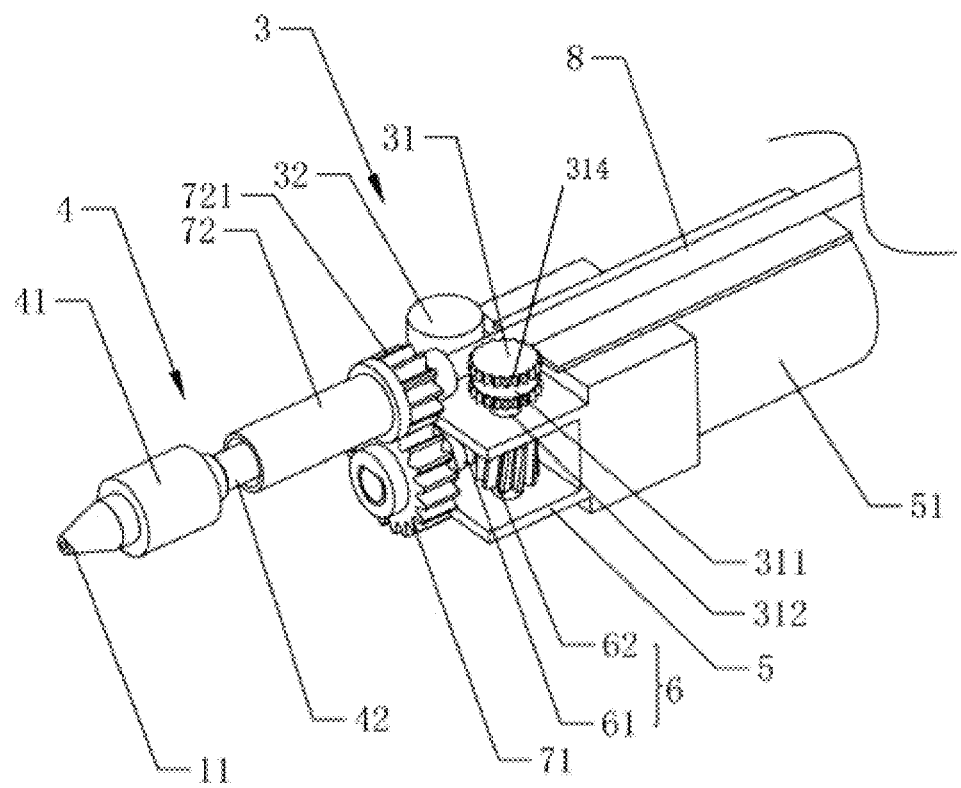
FIG. 8 is a schematic structural diagram of a filament feeding mechanism and a stirring mechanism according to an embodiment.

A 3D printing pen, as shown in FIGS. 1, 2, and 8, includes a pen body 1 having a pen-like shape. A nozzle 11 is provided at a head end of the pen body 1, a power socket 12 and a cartridge 13 detachably inserted into the pen body 1 are provided a tail end of the pen body 1, and a dyeing member 134 is provided on the cartridge 13. A filament feeding channel through which a filament passes is formed in the pen body 1. The pen body 1 is further provided with a dyeing mechanism 2, a filament feeding mechanism 3, and a stirring mechanism 4. The dyeing mechanism 2 includes one or more driving mechanisms, and each driving mechanism drives the corresponding dyeing member 134 to dye the filament. The filament feeding mechanism 3 is configured to convey the filament to the nozzle 11. The stirring mechanism 4 includes a heating element 41 for heating and melting the filament, the heating element 41 may be configured as a heating wire, and the stirring mechanism 4 is configured to stir the molten filament.

Embodiment 2

Figure 3:
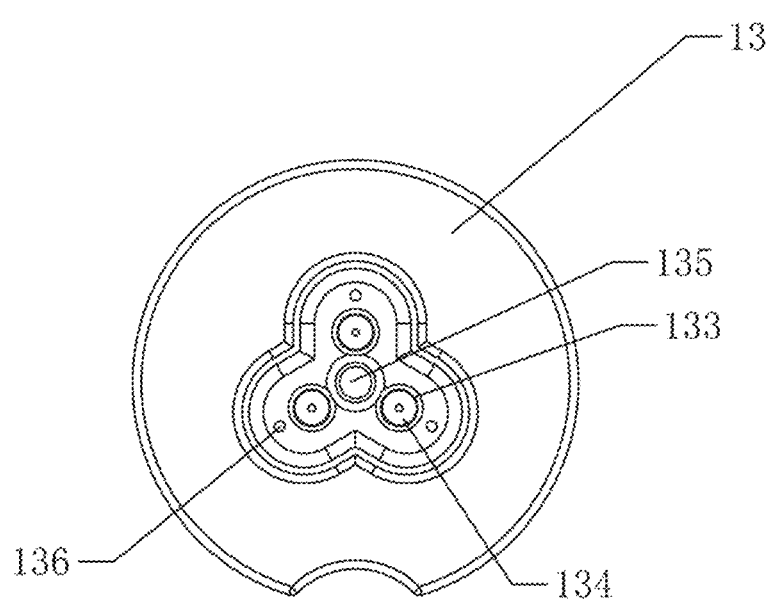
FIG. 3 is a schematic structural diagram of a front end surface of a cartridge according to an embodiment.
Figure 4:
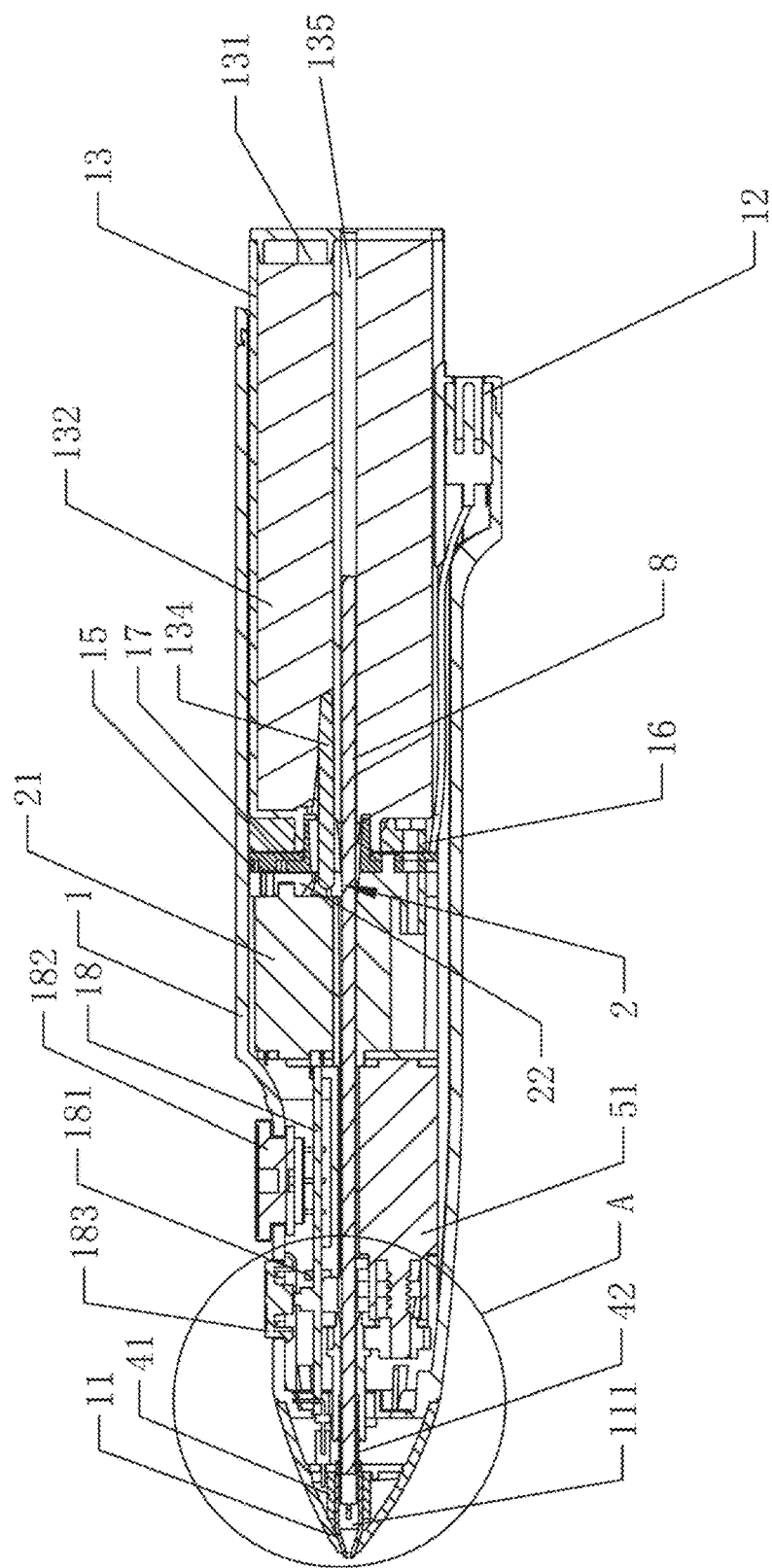
FIG. 4 is a section view according to an embodiment.
Figure 5:
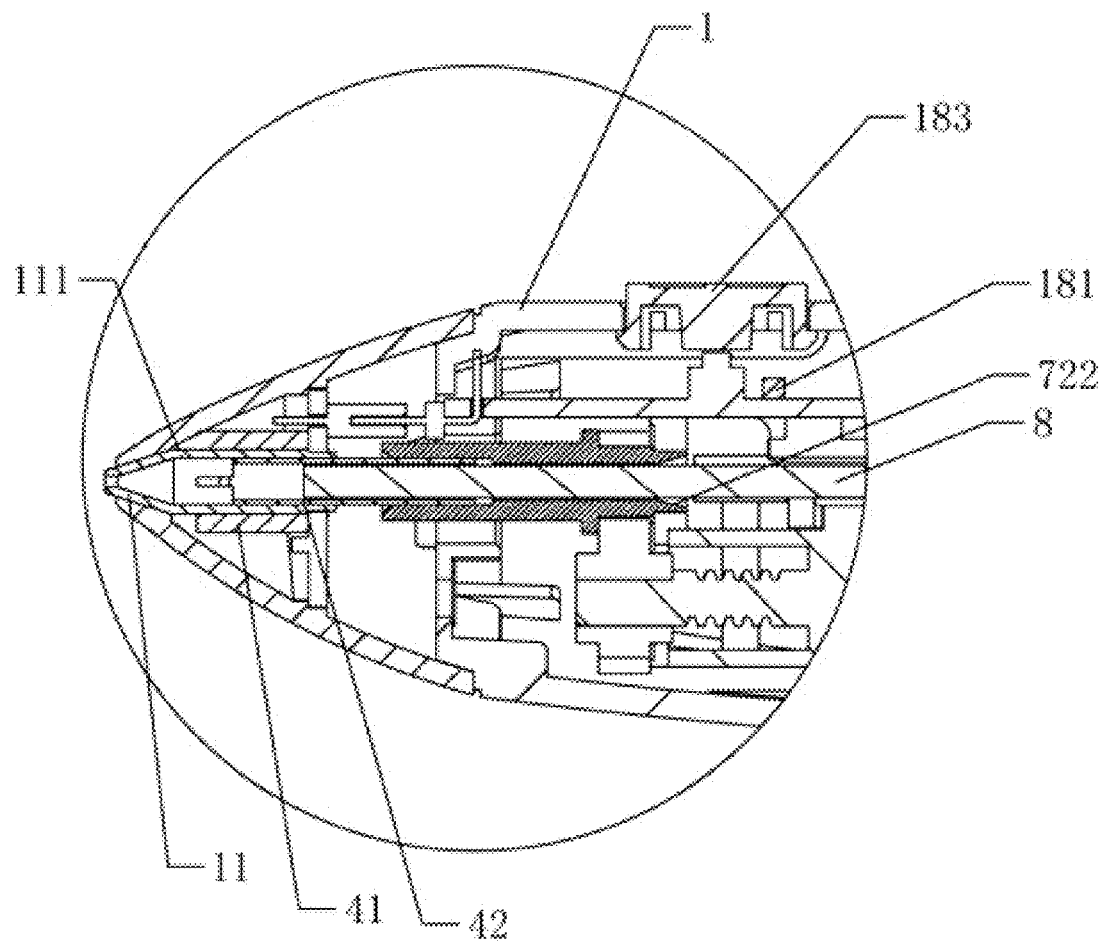
FIG. 5 is an enlarged view of area A in FIG. 4.

As shown in FIGS. 2, 3, and 4, the cartridge 13 is divided into one or more ink reservoirs 131, an ink storage unit 132 is filled in each ink reservoir 131, and the ink storage unit 132 is an ink storage sponge (in other embodiments, the ink storage sponge may be replaced with high molecular polyurethane) and a color dye. Each ink reservoir 131 is correspondingly provided with an ink outlet 133, and the dyeing member 134 is inserted into the ink outlets 133 in a one-to-one correspondence manner. The color dye may permeate into the dyeing member 134, the dyeing member 134 has certain elasticity, and the dyeing member 134 may adopt a bar material. A filament hole 135 through which the filament penetrates is formed in the center of the cartridge 13 in a length direction. The three ink reservoirs 131 are circumferentially distributed on the cartridge 13, the filament hole 135 is located in the center of the cartridge 13, and the three dyeing members 134 are distributed around the filament hole 135. Air holes 136 in one-to-one correspondence to the ink reservoirs 131 are formed in an end portion of the cartridge 13. The air holes 136 are configured to keep the inside and outside atmospheric pressures of the ink reservoirs 131 to be consistent, thereby preventing forming negative pressures in the ink reservoirs 131 during ink discharging to avoid the problem that the ink cannot flow out of the ink outlets 133. In addition, the ink may be prevented from being ejected out during use in a relatively low air pressure environment.

Embodiment 3

Figure 6:
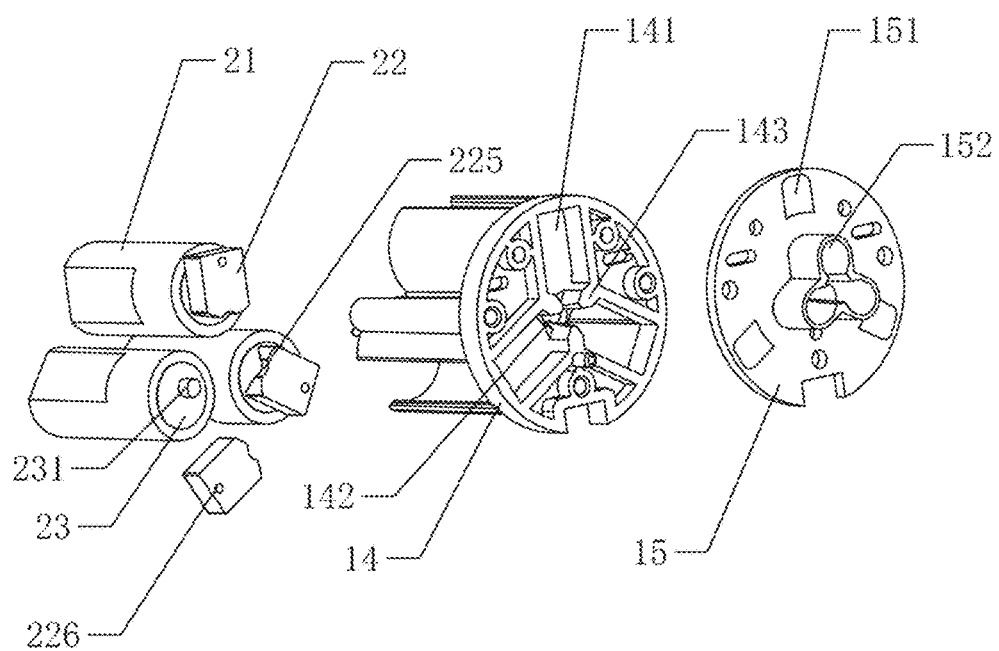
FIG. 6 is a schematic structural diagram of a color changing motor, a support, and a pressing plate in a separated state according to an embodiment.
Figure 7:
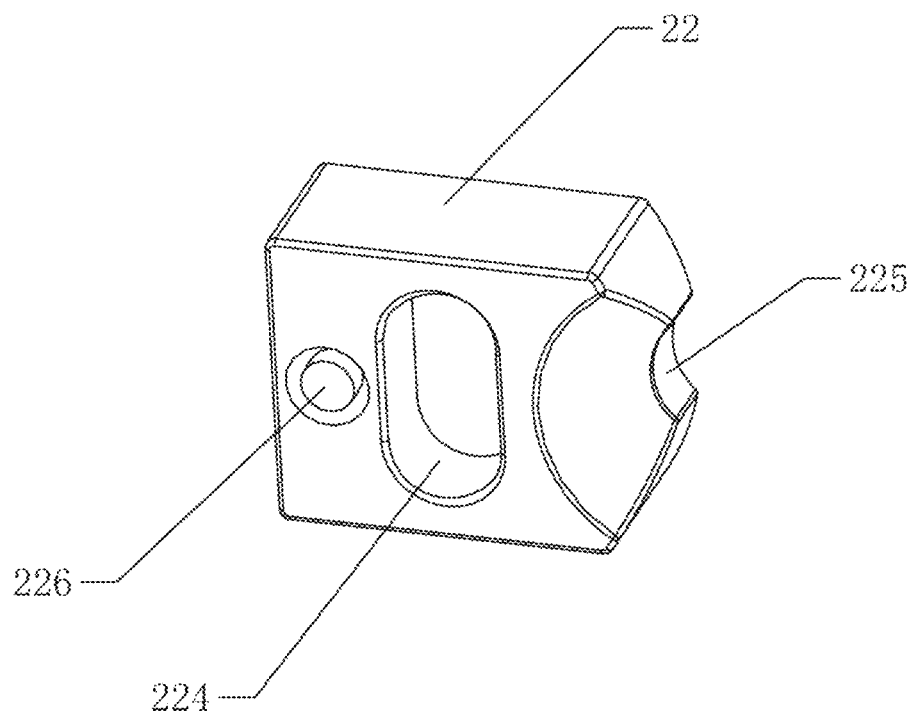
FIG. 7 is a schematic structural diagram of a sliding block according to an embodiment.

As shown in FIGS. 4, 6, and 7, the driving mechanism includes a sliding block 22, a color changing motor 21, an eccentric wheel disc 23 provided on an output end of the color changing motor 21. The eccentric wheel disc 23 includes an eccentric column 231. The sliding block 22 is provided with an strip-shaped groove 224. The arrangement direction of the strip-shaped groove 224 is perpendicular to the sliding direction of the sliding block 22, and the eccentric column 231 is embedded in the strip-shaped groove 224 and moves with the strip-shaped groove 224. A support 14 is provided in the pen body 1, and three sliding grooves 141 for sliding of the sliding blocks 22 are formed in the end part of the support 14. The color changing motor 21 is fixedly mounted on the support 14, and the color changing motor 21 drives the sliding block 22 to move towards the corresponding dyeing member 134, so that the dyeing member 134 is close to the filament. When the sliding block 22 moves away from the dyeing member 134, the dyeing member 134 is far away from the filament. An arc-shaped recess 225 is formed in an end face of the sliding block 22 close to the corresponding dyeing member 134, and the arc-shaped groove 225 fits the dyeing member 134. When the sliding block 22 drives the corresponding dyeing member 134 to be close to the filament, the dyeing member 134 is correspondingly embedded in the arc-shaped recess 225. When the sliding block 22 drives the dyeing member 134. the arc-shaped recess 225 has a good limiting effect on the dyeing member 134 to a certain extent and prevents the dyeing member 134 from being separated from the sliding block 22. In the use state, the cartridge 13 is inserted into the pen body 1, the filament 8 penetrates through the filament hole 135, and the dyeing member 134 is located around the filament. The color changing motor 21 includes a first color changing motor 211, a second color changing motor 212, and a third color changing motor 213. The sliding block 22 includes a first sliding block 221 corresponding to the first color changing motor 211, a second sliding block 222 corresponding to the second color changing motor 212, and a third sliding block 223 corresponding to the third color changing motor 213. The dyeing member 134 includes a first dyeing member 1341 corresponding to the first sliding block 221, a second dyeing member 1342 corresponding to the second sliding block 222, and a third dyeing member 1343 corresponding to the third sliding block 223.

When the filament is dyed, the color changing motor 21 is started to drive the eccentric wheel disc 23 to rotate. When the eccentric wheel disc 23 rotates, under the cooperation of the eccentric column 231 and the strip-shaped groove 224, the sliding block 22 moves towards the dyeing member 134 along the corresponding sliding groove 141 until the dyeing member 134 is attached to the side wall of the filament. After the dyeing is completed, the color changing motor 21 drives the sliding block 22 to reset, and since the dyeing member 134 is not driven by the sliding block 22, the dyeing member 134 may be far away from the filament in its own elastic force.

Embodiment 4

As shown in FIGS. 4, 6, and 7, the sliding block 22 is provided with a magnetic member 226, a pressing plate 15, a branch circuit board 17, and a pressing block 16 are provided in the pen body 1, the pressing plate 15 and the pressing block 16 cooperate to press and fix the branch circuit board 17, and a sensing element 151 is also provided on the pressing plate 15. In this embodiment, the sensing element 151 is configured as a Hall sensor, and the Hall sensor is in sensing fit with the magnetic member 226, and is configured to detect the position of the sliding block 22 after displacement. When the sliding 22 drives the magnetic member 226 to move, the Hall sensor may sense the position of the sliding block 22 in real time by using the principle that the magnetic field change between the Hall sensor and the magnetic member 226 causes the Hall sensor to generate a potential difference, so that the dyeing concentration may be controlled to a certain extent. Limiting insertion holes 152 are also provided in the center of the pressing plate 15. When the cartridge 13 is inserted into the pen body 1, the dyeing member 134 is correspondingly inserted into the corresponding limiting insertion hole 152, thereby achieving the effect of rapid alignment and limiting.

As shown in FIG. 6, a through hole 142 through which the filament passes is formed in the center of the support 14, the sliding grooves 141 are distributed around the through hole 142, and the sliding grooves 141 are communicated with the through hole 142. The dyeing member 134 moves in a position where the sliding grooves 141 are communicated with the through hole 142. Three equally-distributed anti-shake ribs 143 are provided on the inner wall of the through hole 142. When the filament 8 is fed into the through hole 142, the anti-shake ribs 143 abut against the side wall of the filament, so that the filament may be prevented from shaking in the feeding and dyeing process to a certain extent, the ink is prevented from being remained in the tube wall when the dyed filament passes through the filament feeding channel, the dyeing is uniform, and the dyeing effect is better.

As shown in FIG. 4, a main circuit board 18 is provided in the pen body 1, a power socket 12 is electrically connected to the main circuit board 18, and an indicator light 181 is provided on the main circuit board 18. The side wall of the pen body 1 is also provided with a color changing rotary disc 182 and a filament feeding button 183 electrically connected to the main circuit board 18. The color changing rotary disc 182 controls the color changing motor 21 of the dyeing mechanism 2, and the color changing rotary disc 182 is configured to control switching of different color changing motors 21. A plurality of position identifiers are provided on the color changing rotary disc 182, and the position identifiers include numbers 1, 2, 3, 4, 5, 6, 7, and 8. The pen body 1 is provided with a positioning identifier 19. When the color changing rotary disc 182 is rotated, one of the position identifiers corresponds to the positioning identifier 19. When the color to be dyed of the filament is replaced, the color changing rotary disc 182 is rotated, and when different position identifiers correspond to the positioning identifier 19, the color changing motor 22 controlling movement of the dyeing member 134 with different colors may be started, and the user may conveniently perform selection and switching intuitively to realize the color changing process for dyeing. The user may select different colors to dye the filament according to preferences of the user. Therefore, without replacing the filament, multi-color conversion may be realized on the same filament, filaments with different colors do not need to be purchased, and the cost is low.

Embodiment 5

Figure 9:
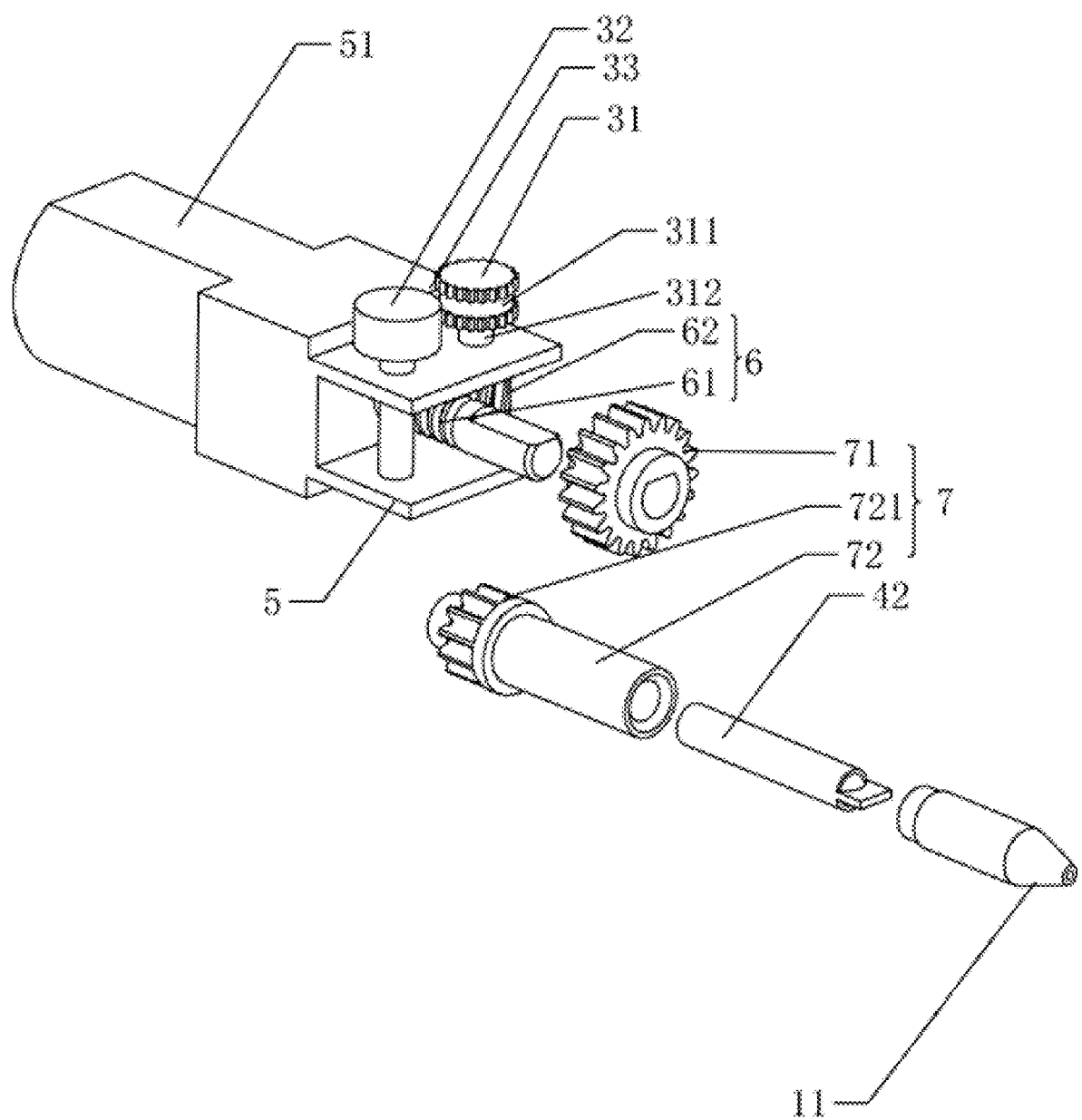
FIG. 9 is a schematic structural diagram of a stirring mechanism and a nozzle in a separated state according to an embodiment.

As shown in FIGS. 8 and 9, a mounting frame 5 and a driving component mounted on the mounting frame 5 are provided in the pen body 1. The driving component is configured as a driving motor 51. A first transmission assembly 6 is provided between the driving motor 51 and a filament feeding mechanism 3, and a second transmission assembly 7 is provided between the driving motor 51 and a stirring mechanism 4. The driving motor 51 synchronously acts on the filament feeding mechanism 3 and the stirring mechanism 4. The first transmission assembly 6 includes a first reversing gear 61; the second transmission assembly 7 includes a stirring transmission gear 71; and both the first reversing gear 61 and the stirring transmission gear 71 are coaxially provided on an output end of the driving motor 51. After the driving motor 51 is started, the output end simultaneously drives the first reversing gear 61 and the stirring transmission gear 71 to rotate, so that the same driving component may simultaneously realize double output through the first transmission assembly 6 and the second transmission assembly 7.

As shown in FIGS. 8 and 9, the filament feeding mechanism 3 includes a filament feeding gear set, the filament feeding gear set includes a filament feeding driving gear 31 and a filament feeding driven wheel 32, and a filament feeding channel 33 is formed between the filament feeding driving gear 31 and the filament feeding driven wheel 32. An annular embedding groove 311 is formed in the side wall of the filament feeding driving gear 31, and the filament feeding driving gear 31 is provided with a rotating shaft 312. The arrangement of the annular embedding groove 311 allows the side wall of the filament 8 to be correspondingly embedded in the annular embedding groove 311, and the filament is limited in the circumferential direction, which allows linear filament feeding and limits rotation of the side wall, thereby preventing the fed filament from twisting and winding due to the stirring action of the stirring mechanism 4 at the front end to a certain extent. The first transmission assembly 6 further includes a second reversing gear 62 coaxially provided on the rotating shaft 312, and the second reversing gear 62 is meshed with the first reversing gear 61. The filament is fed into the filament feeding channel 33, and the filament feeding driving gear 31 and the filament feeding driven wheel 32 are located on the two sides of the filament, respectively, and generate a certain clamping force on the side wall of the filament. When the first reversing gear 61 rotates, the second reversing gear 62 is driven to rotate, and the second reversing gear 62 drives the filament feeding driving gear 31 to rotate through the rotating shaft 312. Since the side wall of the filament is attached to the side wall of the filament feeding driving gear 31, when the filament feeding driving gear 31 rotates, the filament feeding driving gear cooperates with the filament feeding driven wheel 32 to convey the filament. After the annular embedding groove 311 is provided in the circumferential side of the filament feeding driving gear 31, two anti-rotation ribs 314 which are symmetrical in a vertical direction are formed. In the feeding process, the two anti-rotation ribs 314 make contact with the filament surface, so that rotation of the filament in the feeding process is limited.

The annular embedding groove 311 is provided in the circumferential side of the driving gear, so that two anti-rotation ribs 314 which are symmetrical in a vertical direction are formed in the circumferential side of the driving gear, so as to limit the rotation of the filament in the feeding process, prevent the filament located outside the printer body from winding, and also avoid color contamination between the dyeing members of the cartridge due to rotation of the filament.

The first transmission assembly 6 drives the filament feeding mechanism 3 to move, and the filament feeding mechanism 3 conveys the filament to the nozzle 11. In addition, the second transmission assembly 7 drives the stirring mechanism 4 to synchronously move, and the stirring mechanism 4 stirs and uniformly mixes the molten filament. Therefore, filament feeding and stirring processes are synchronously carried out, discharging while stirring is realized, and the probability of a material breaking phenomenon is reduced. In addition, on one hand, use of a single-drive double-output approach has the effects of saving energy and reducing power; on the other hand, the printing pen also has a more compact structure in terms of the overall layout, and is convenient for the user to hold.

Embodiment 6

As shown in FIGS. 4, 5, 8, and 9, the stirring mechanism 4 includes a stirring tube 42 in which the filament is fed, and the stirring tube 42 is rotatably provided in the pen body 1. A stirring cavity 111 in which the stirring tube 42 extends is formed in the nozzle 11, and the stirring tube 42 is communicated with the stirring cavity 111. The inner wall of the nozzle 11 is attached to the outer wall of the stirring tube 42 to form an overlapping part, and the heating element 41 is provided outside the overlapping part. The overall heating of the side wall of the nozzle 11 is uniform, so that the overall melting effect of the filament is good, and sufficient stirring is facilitated. The driving motor 51 drives the stirring tube 42 to rotate through the second transmission assembly 7. The second transmission assembly 7 further includes a connection sleeve 72, and a stirring tube gear 721 coaxially provided on the connection sleeve 72. The connection sleeve 72 is made of a plastic material with poor thermal conductivity. The stirring tube gear 721 is meshed with the stirring transmission gear 71, and when the stirring transmission gear 71 rotates, the stirring tube gear 721 may be driven to rotate therewith, so that the stirring tube 42 is driven to rotate to realize the stirring process. The connection sleeve 72 is coaxially sleeved on a rear end of the stirring tube 42, the stirring tube 42 is configured as a metal stirring tube 42, and a rear end of the connection sleeve 72 is provided with a flared guiding inclined surface 722. When the filament is inserted into the connection sleeve 72, the arrangement of the guiding inclined surface 722 facilitates guiding the filament into the connection sleeve 72, thereby realizing quick and accurate insertion.

When the heating element 41 heats the stirring cavity 111, since the metal stirring tube 42 has good thermal conductivity, the filament in the stirring cavity 111 may be rapidly melt. However, when the connection sleeve 72 made of plastic is connected to the rear end of the stirring tube 42, since the thermal conductivity of the plastic is worse than that of the metal, and the connection sleeve and the stirring tube 42 are separately configured into two components, the filament may be prevented from melting and softening in advance due to the heat conduction of the metal stirring tube 42 to some extent before entering into the stirring cavity 111. After the plastic connection sleeve 72 is employed for certain thermal insulation, the filament may be conveniently pushed into.

The filament whose side wall is dyed with multiple colors fed into the stirring tube 42, a front end of the filament extends into the stirring cavity 111, and the heating element 41 generates heat to heat and melt the color filament in the stirring cavity 111. After the driving motor 51 is started, the stirring tube 42 is driven to rotate, so that the stirring tube 42 stirs and mixes the molten color filament in the stirring cavity 111, and the filaments with different colors are uniformly stirred. The color filament may also be driven to move towards the nozzle 11 during stirring, and the uniformly stirred color filament in the stirring cavity 111 may be extruded from the nozzle 11 in the driving process, so that multi-color mixing may be realized during use, and after stirring, the mixed color is uniform, and the color texture is good.

Embodiment 7

As shown in FIGS. 4, 5, 6, 21, and 22, a dyeing unit includes a driving mechanism and a dyeing mechanism 2, and the driving mechanism drives the dyeing mechanism 2 to dye the filament 8. The dyeing mechanism 2 includes a cartridge 13 and a dyeing member 134 provided on the cartridge 13. The cartridge 13 is divided into one or more ink reservoirs 131. An ink storage unit 132 is filled in each ink reservoir 131. The ink storage unit 132 may be a high-density polyurethane sponge material, and may also be any material capable of absorbing water or oil in other embodiments. Ink is adsorbed on the ink storage unit 132, and the ink is oily ink. Each ink reservoir 131 is correspondingly provided with an ink outlet, and the dyeing member 134 is inserted into the ink outlets 133 in a one-to-one correspondence manner. The dyeing rods are fiber pen points, and may absorb the ink in the ink reservoirs 131 to be stained. The dyeing member 134 has certain elasticity. A filament hole 135 through which the filament 8 penetrates is formed in the center of the cartridge 13 in a length direction. The ink reservoirs 131 are circumferentially distributed on the cartridge 13, the filament hole 135 is located in the center of the cartridge 13, and the dyeing member 134 is evenly distributed around the filament hole 135. There is a gap between the dyeing member 134 and the filament hole 135. Air holes 136 are formed in an end portion of the cartridge 13, and the air holes 136 are communicated with the ink reservoirs 131 in a one-to-one correspondence manner. The air holes 136 are configured to keep the inside and outside atmospheric pressures of the ink reservoirs 131 to be consistent, thereby preventing forming negative pressures in the ink reservoirs 131 during ink discharging to avoid the problem that the ink cannot flow out of the ink outlets 133. In addition, the ink may be prevented from being ejected out during use in a relatively low air pressure environment.

An insertion part 138 is provided at the lower end of the cartridge 13, a position of the printing pen body 1 connected to the cartridge 13 is an insertion position, and when the cartridge 13 is inserted into the printing pen body 1, the insertion part 138 is accurately inserted into the insertion position. When the cartridge 13 is not used, the cartridge may be covered by a protective cover 137, thereby facilitating storage of the cartridge 13 and avoiding ink drying.

Embodiment 8

Figure 10:
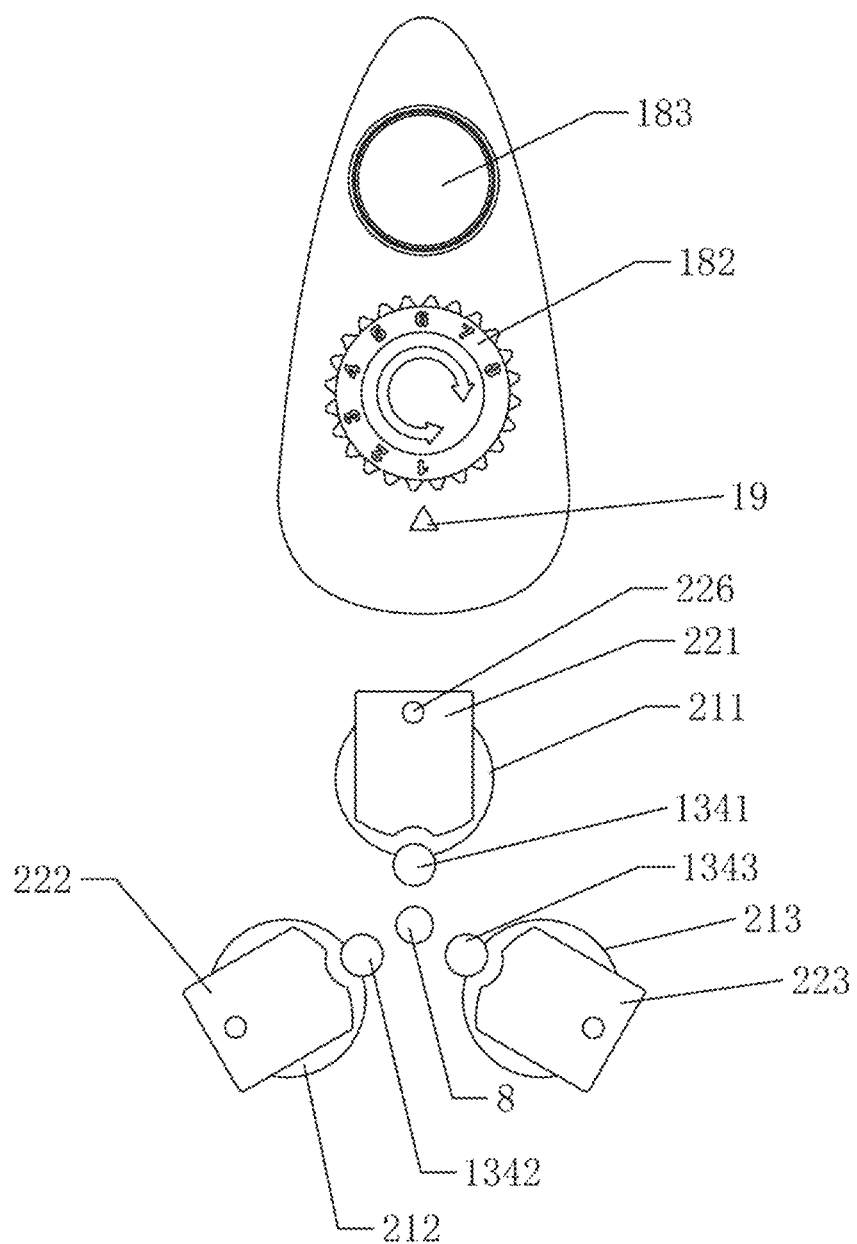
FIG. 10 is a schematic diagram of a position of a dyeing mechanism corresponding to a color changing rotary disc in a first position according to an embodiment.
Figure 11:
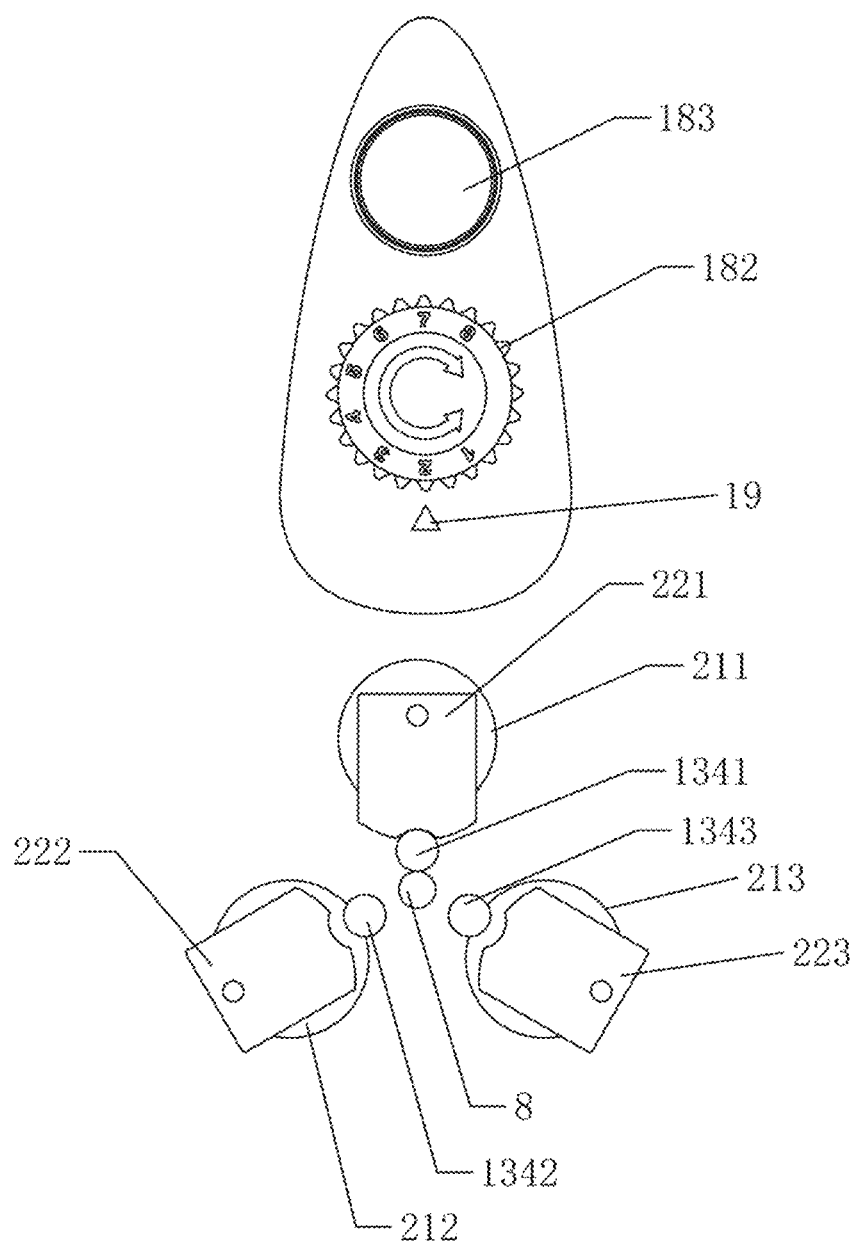
FIG. 11 is a schematic diagram of a position of a dyeing mechanism corresponding to a color changing rotary disc in a second position according to an embodiment.
Figure 12:
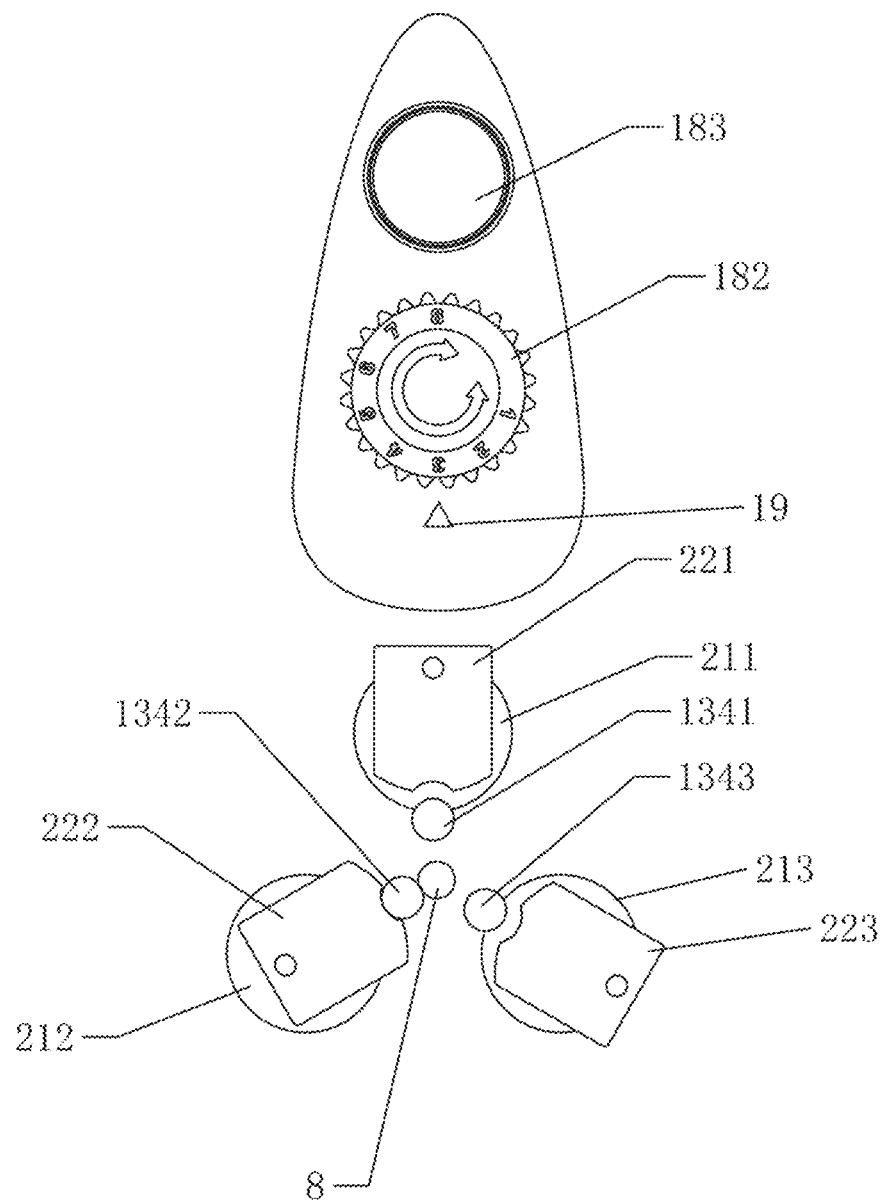
FIG. 12 is a schematic diagram of a position of a dyeing mechanism corresponding to a color changing rotary disc in a third position according to an embodiment.
Figure 13:
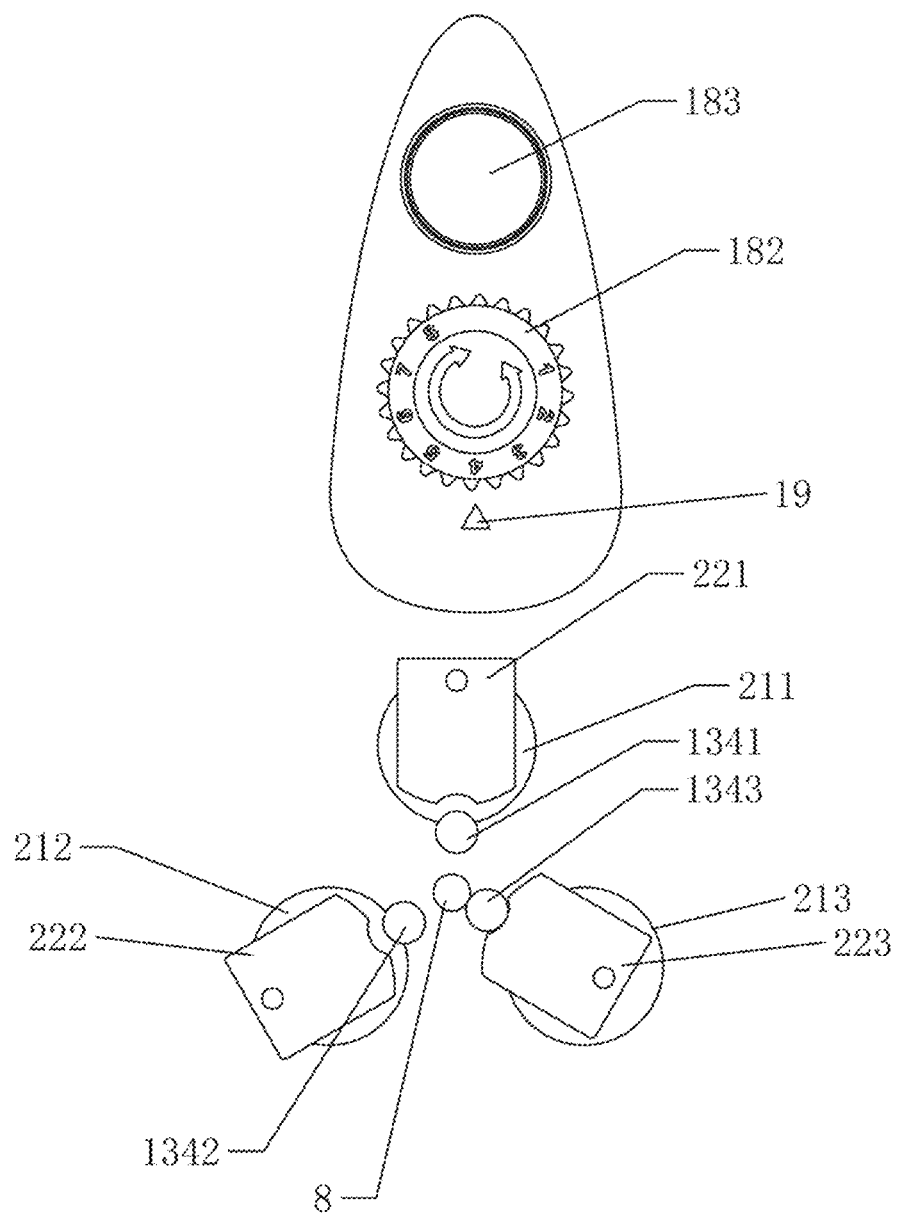
FIG. 13 is a schematic diagram of a position of a dyeing mechanism corresponding to a color changing rotary disc in a fourth position according to an embodiment.
Figure 14:
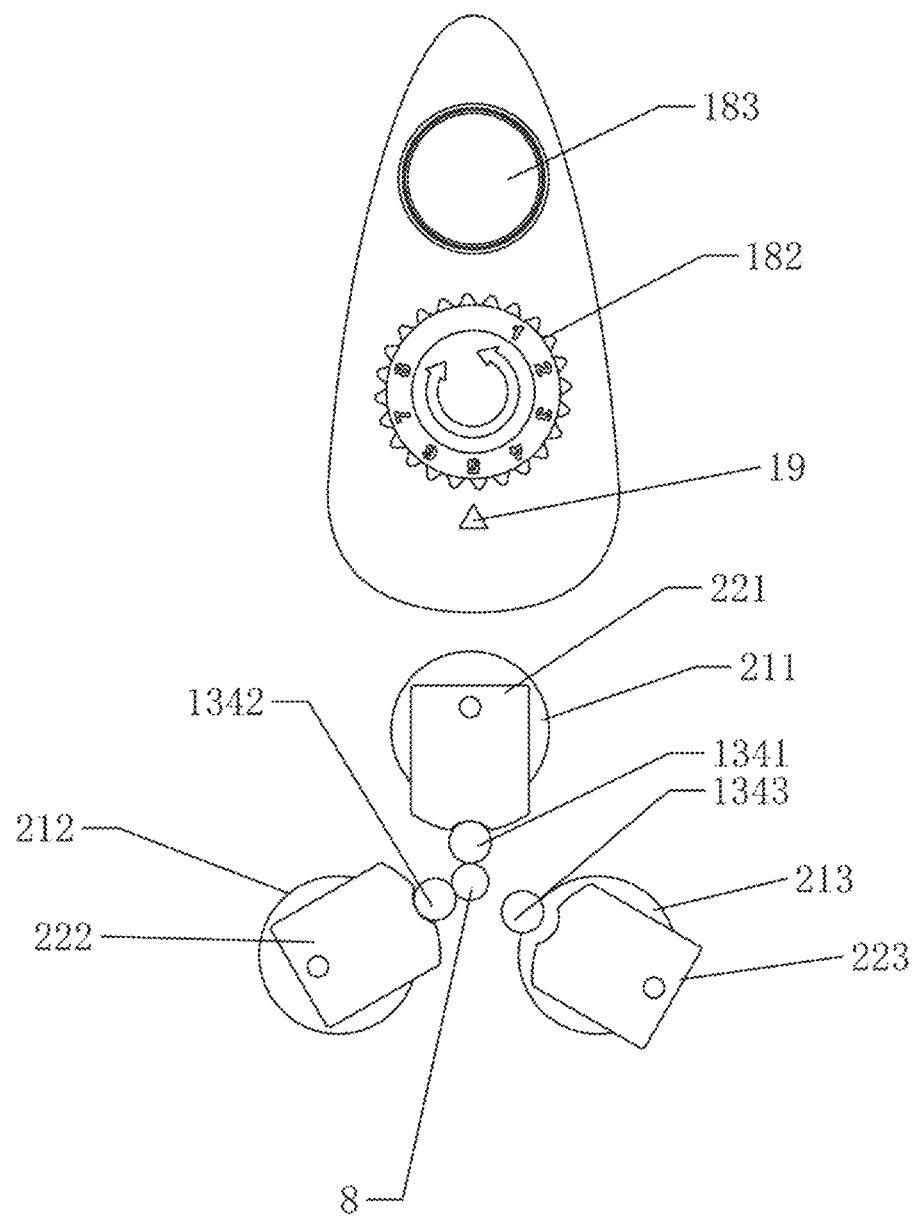
FIG. 14 is a schematic diagram of a position of a dyeing mechanism corresponding to a color changing rotary disc in a fifth position according to an embodiment.
Figure 15:
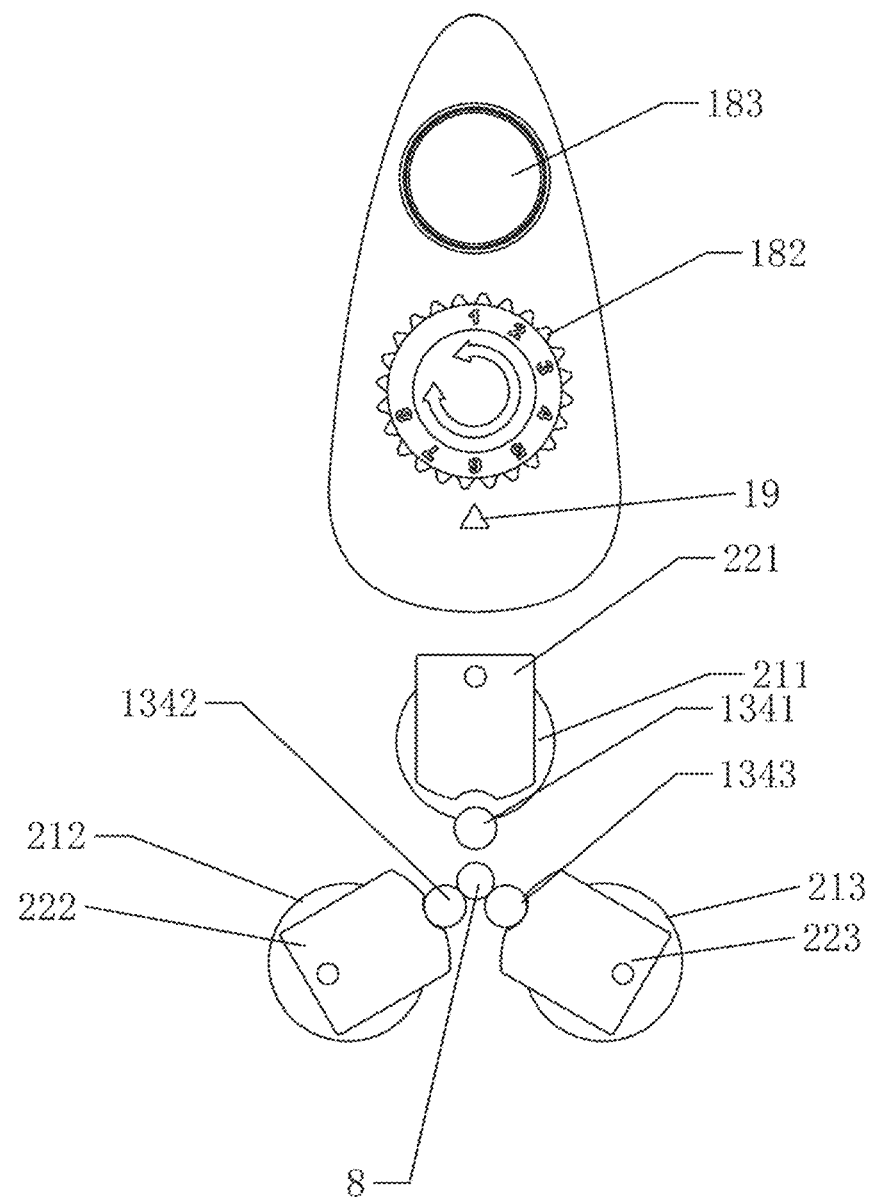
FIG. 15 is a schematic diagram of a position of a dyeing mechanism corresponding to a color changing rotary disc in a sixth position according to an embodiment.
Figure 16:
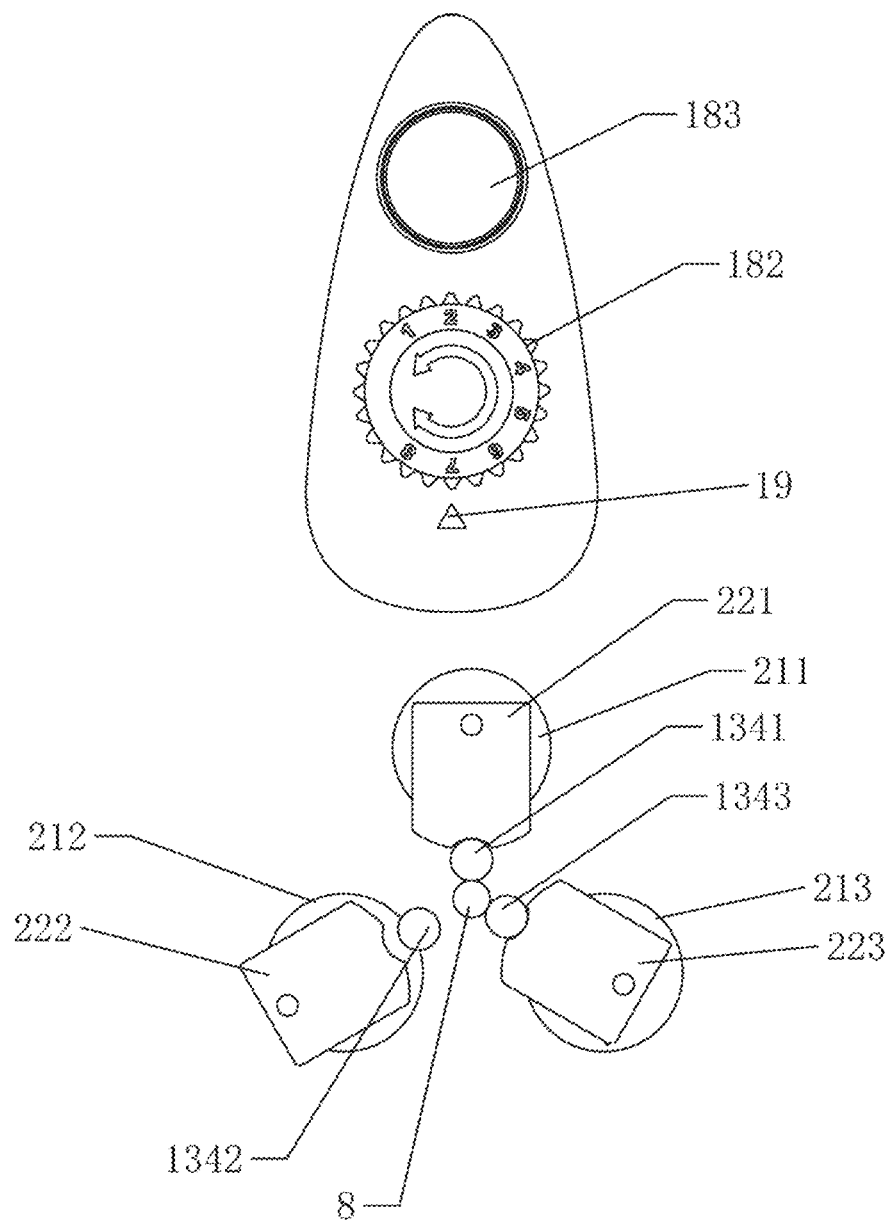
FIG. 16 is a schematic diagram of a position of a dyeing mechanism corresponding to a color changing rotary disc in a seventh position according to an embodiment.
Figure 17:
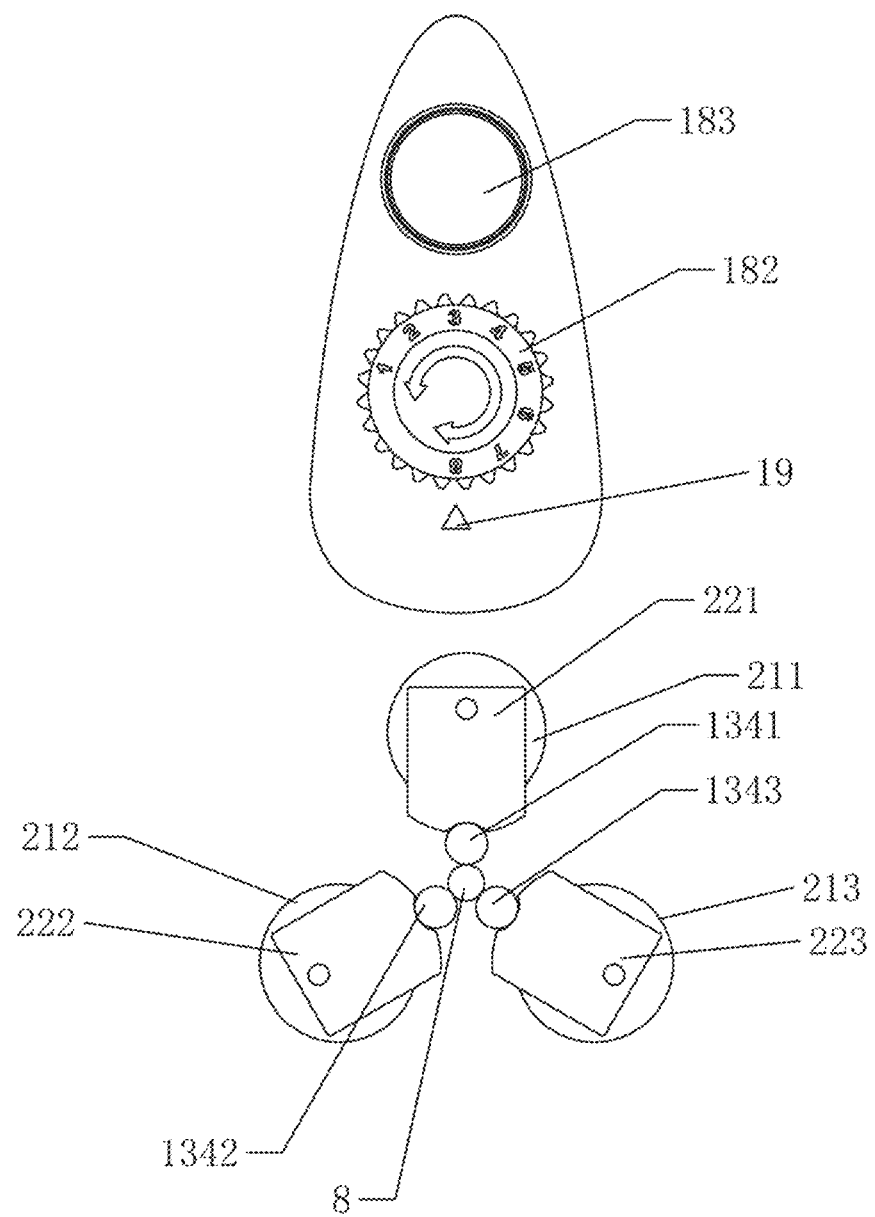
FIG. 17 is a schematic diagram of a position of a dyeing mechanism corresponding to a color changing rotary disc in an eighth position according to an embodiment.
Figure 18:
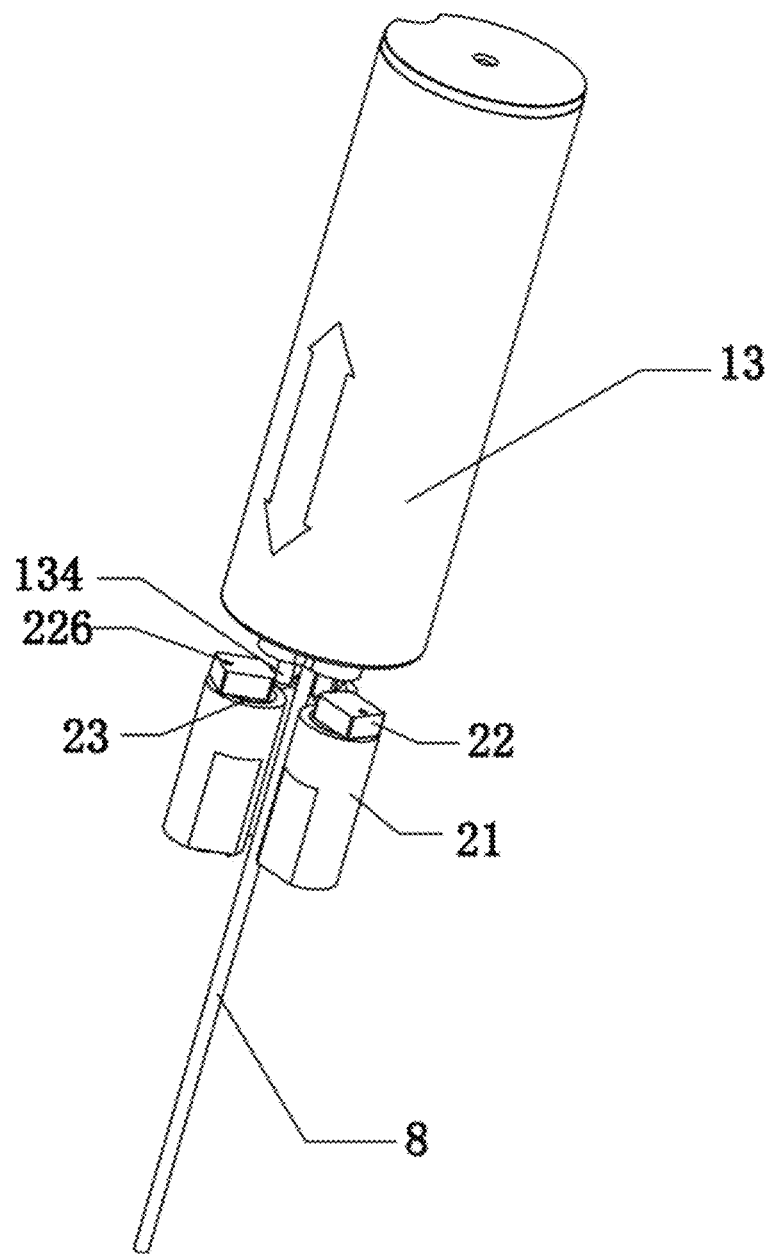
FIG. 18 is a schematic diagram of a position relationship of a dyeing assembly and a driving mechanism.
Figure 19:
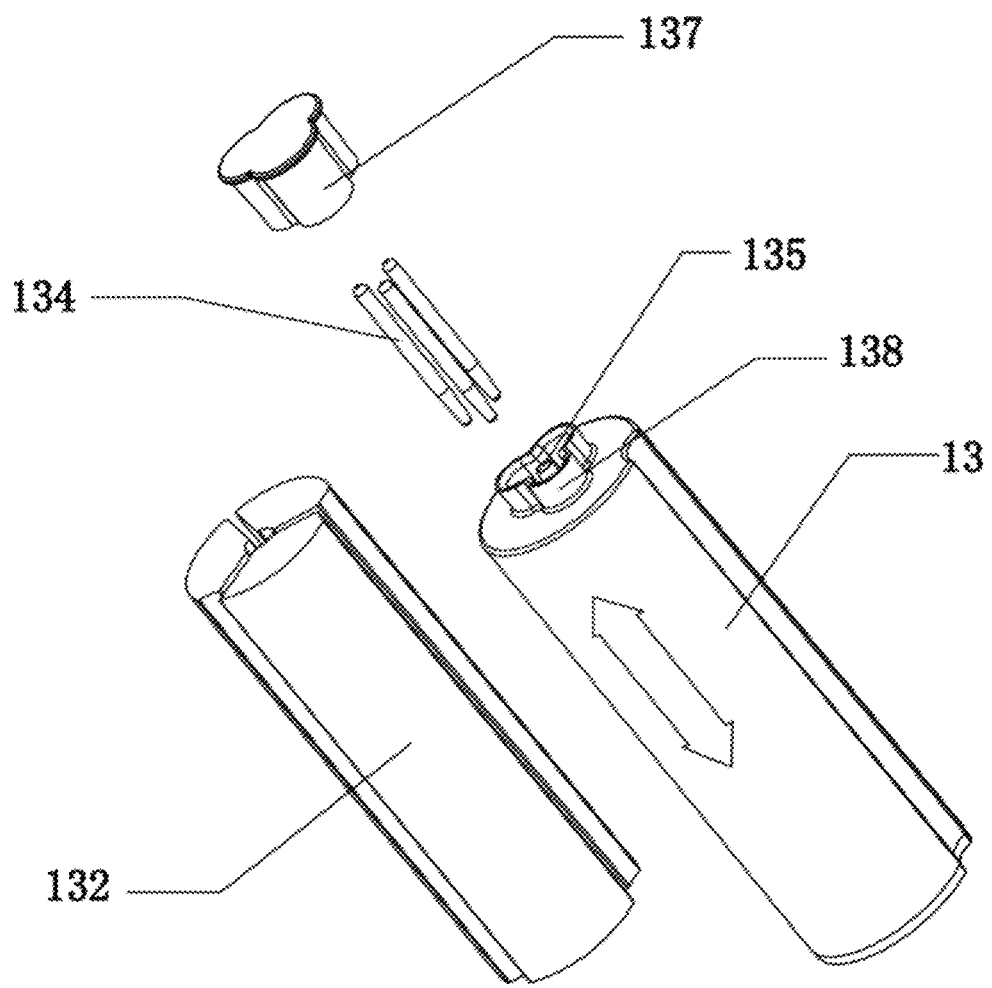
FIG. 19 is a schematic diagram of an exploded structure of a dyeing assembly.

A use method in the present description includes the following steps:

S1: power-on: a power socket 12 is plugged into a power supply to be energized, and if an indicator light 181 maintains constant yellow light, it is considered that the power supply is connected, and the power supply supplies power to a driving mechanism of a dyeing mechanism 2, a filament feeding mechanism 3, and a stirring mechanism 4;

S2: heating: a heating element 41 is energized for heating, the indicator light 181 flashes red, and after a set temperature is reached, the indicator light 181 maintains constant green light, it is indicated that the heating is completed;

S3: loading of the filament: the filament is fed into the filament feeding channel of the pen body 1 from a tail portion of the cartridge 13, and the filament passes through the filament feeding mechanism 3 to extend into the filament feeding channel 33; and in this case, a position identifier 1 of a color changing rotary disc 182 corresponds to a positioning identifier 19, a filament feeding button 183 is pressed, and a filament feeding gear set conveys the filament forwards until a molten filament exits from a pen point nozzle 11, thereby realizing loading of the filament; and S4: dyeing:

in this embodiment, three dyeing members 134 are respectively configured as three primary colors, i.e., red, yellow and blue, the color changing is realized by adjusting the color changing rotary disc 182, and the color changing process is as follows:

(1) when an initial position of the color changing rotary disc 182 is a first position, a magnetic member 226 on a sliding block 22 is located directly below a Hall sensor when three color changing motors 21 are in the initial position; the corresponding state is as shown in FIG. 10; and the measured voltage is highest, and in this case, a transparent molten filament is extruded from the nozzle 11;

(2) when the color changing rotary disc 182 rotates to a second position, a first color changing motor 211 rotates to drive a first sliding block 221 to move, so that a first dyeing member 1341 is driven to dye red on the side wall of the filament 8; and the corresponding state is as shown in FIG. 11;

(3) when the color changing rotary disc 182 rotates to a third position, the first color changing motor 211 returns to the original position, and a second color changing motor 212 rotates to drive a second sliding block 222 to move, so that a second dyeing member 1342 is driven to dye yellow on the filament 8; and the corresponding state is as shown in FIG. 12;

(4) when the color changing rotary disc 182 rotates to a fourth position, the second color changing motor 212 returns to the original position, and a third color changing motor 213 rotates to drive a third sliding block 223 to move, so that a third dyeing member 1343 is driven to dye blue on the filament 8; and the corresponding state is as shown in FIG. 13;

(5) when the color changing rotary disc 182 rotates to a fifth position, the third color changing motor 213 returns to the original position, and the first color changing motor 211 and the second color changing motor 212 rotate, where the first color changing motor 211 drives the first sliding block 221 to move, so that the first dyeing member 1341 is driven to dye red on the filament 8, and the second color changing motor 212 drives the second sliding block 222 to move, so that the second dyeing member 1342 is driven to dye yellow on the filament 8; and the corresponding state is as shown in FIG. 14;

(6) when the color changing rotary disc 182 rotates to a sixth position, the first color changing motor 211 returns to the original position, and the second color changing motor 212 and the third color changing motor 213 rotate, where the second color changing motor 212 drives the second sliding block 222 to move, so that the second dyeing member 1342 is driven to dye yellow on the filament, and the third color changing motor 213 drives the third sliding block 223 to move, so that the third dyeing member 1343 is driven to dye blue on the filament; and the corresponding state is as shown in FIG. 15;

(7) when the color changing rotary disc 182 rotates to a seventh position, the second color changing motor 212 returns to the original position, and the first color changing motor 211 and the third color changing motor 213 rotate, where the first color changing motor 211 drives the first sliding block 221 to move, so that the first dyeing member 1341 is driven to dye red on the filament, and the third color changing motor 213 drives the third sliding block 223 to move, so that the third dyeing member 1343 is driven to dye blue on the filament; and the corresponding state is as shown in FIG. 16;

(8) when the color changing rotary disc 182 rotates to an eighth position, the three color changing motors 21 rotate synchronously, where the first color changing motor 211 drives the first sliding block 221 to move, so that the first dyeing member 1341 is driven to dye red on the filament, the second color changing motor 212 drives the second sliding block 222 to move, so that the second dyeing member 1342 is driven to dye yellow on the filament, and the third color changing motor 213 drives the third sliding block 223 to move, so that the third dyeing member 1343 is driven to dye blue on the filament; and the corresponding state is as shown in FIG. 17;

the positions (1)-(8) corresponding to the color changing rotary disc 182 may be switched arbitrarily by the user according to willingness of the user;

S5. filament feeding and stirring: the filament feeding button 183 is pressed, the dyed filament is fed into the stirring cavity 111, and the color filament is melted after being heated by the heating element 41, and stirred by the stirring tube 42; and S6. filament feeding and extrusion: the filament feeding button 183 is pressed, and the filament feeding mechanism 3 drives the uniformly stirred molten color filament to move towards and to be extruded from the nozzle 11 through the non-molten filament at the rear end.

During extrusion, when in the second position in S4, a red molten filament is obtained; in the third position in S4, a yellow molten filament is obtained; in the fourth position in S4, a blue molten filament is obtained; in the fifth position in S4, an orange molten filament formed by uniform stirring and color mixing is obtained; in the sixth position in S4, a green molten filament formed by uniform stirring and color mixing is obtained; in the seventh position in S4, a purple molten filament formed by uniform stirring and color mixing is obtained; and in the eighth position in S4, a black molten filament formed by uniform stirring and color mixing is obtained.

The basic operation principle of the present description is: during use, the filament is first conveyed into the filament feeding channel of the pen body 1; after the power supply component is energized, the color changing motor drives the dyeing member to dye the side wall of the filament, and the filament feeding mechanism 3 drives the dyed filament to be conveyed to the stirring mechanism 4; after the dyed filament extends into the stirring mechanism 4, the heating element 41 heats the solid color filament in the stirring mechanism 4 to enable same to be melted; then, the stirring mechanism 4 stirs the molten filament, and a front end of the filament drives the molten color filament to be extruded from the nozzle 11 while the filament feeding mechanism 3 drives the filament to move to the stirring mechanism 4, thereby realizing 3D drawing; and through cooperation between multiple groups of the color changing motors 21 and the dyeing member, various colors may be dyed on the filament. Therefore, the printing pen has the effects of being rich in colors, strong in interestingness, flexible and diversified, as well as the effects of being convenient to use, low in cost and good in drawing effect.

Color changing of different groups of dyeing mechanisms 2 may be realized by adjusting the color changing rotary disc 182. The user may select different colors to dye the filament according to preferences of the user. Therefore, without replacing the filament, multi-color conversion may be realized on the same filament. The printing pen has the effects of being rich in colors, strong in interestingness, flexible in use, and diversified. Filaments with different colors do not need to be purchased, and the cost is low.

Here, it should be noted that the sequence of the color changing motors 21 and the sequence of the dyeing member 134 are not limited to the sequences described in this embodiment, and adaptive adjustment may be made by change of a procedure and the number of the dyeing mechanisms. In other embodiments, two groups of dyeing mechanisms, four groups of dyeing mechanisms or multiple groups of dyeing mechanisms may be adopted, and one driving mechanism may be used to respectively drive movement of the dyeing member through a linkage structure. In addition, it should be noted that during use, the steps S1-S3 may also take the form of first loading the filament, and then powering up and heating.

The above are only preferred embodiments of the present description. Therefore, the equivalent changes or modifications on the structure, characteristics and principles within the scope of the description patent application shall be all included in the scope of the description patent application.

The invention claimed is:

1. A 3D printing pen, comprising a pen body,
wherein the pen body comprises
a nozzle,
a filament feeding channel,
a filament configured to pass through the filament feeding channel,
a filament feeding mechanism, configured to convey the filament to the nozzle; and
a dyeing mechanism configured to dye the filament, comprising
a driving mechanism, and
a dyeing member connected to the driving mechanism,
wherein the driving mechanism is configured to drive the dyeing member to dye the filament, the driving mechanism comprises
- a sliding block, wherein the sliding block is configured to move in a direction close to the dyeing member such that the dyeing member is close to the filament,
- a color changing motor,
- an eccentric wheel disc connected to an output end of the color changing motor;
  - wherein the eccentric wheel disc comprises an eccentric column;
- a sliding groove, wherein the sliding block is configured to slide within the sliding groove;
  - wherein the sliding block comprises a strip-shaped groove, and
  - the eccentric column configured to embed with the strip-shaped groove and move with the strip-shaped groove.

2. The 3D printing pen according to claim 1, wherein the pen body further comprises a color changing rotary disc, wherein the color changing rotary disc is configured to control the dyeing mechanism, and the color changing rotary disc is configured to control the driving mechanism to switch the dyeing member.

3. The 3D printing pen according to claim 1, wherein the pen body further comprises
- a heating element configured to heat and melt the filament, and
- a stirring mechanism configured to stir the filament molted.

4. The 3D printing pen according to claim 1, wherein the pen body comprises
- a driving component;
- a first transmission assembly disposed between the driving component and the filament feeding mechanism, and
- a second transmission assembly disposed between the driving component and the stirring mechanism;
- wherein the driving component is configured to selectively operate on the filament feeding mechanism and the stirring mechanism.

5. The 3D printing pen according to claim 4, wherein
the first transmission assembly comprises a first reversing gear;
the second transmission assembly comprises a stirring transmission gear; and
wherein the first reversing gear and the stirring transmission gear are configured to coaxially connect to an output end of the driving component.

6. The 3D printing pen according to claim 4, wherein the filament feeding mechanism comprises
- a filament feeding gear set,
  - wherein the filament feeding gear set comprises
    - a filament feeding driving gear,
      - wherein the filament feeding driving gear comprises a rotating shaft;
    - a filament feeding driven wheel, and
    - the filament feeding channel disposed between the filament feeding driving gear and the filament feeding driven wheel, and
- the first transmission assembly further comprises a second reversing gear disposed on the rotating shaft, and
  - wherein the second reversing gear is configured to mesh with the first reversing gear.

7. The 3D printing pen according to claim 5, wherein the second transmission assembly further comprises
- a connection sleeve, and
- a stirring tube gear coaxially connected to the connection sleeve;
  - wherein the stirring tube gear is configured to mesh with the stirring transmission gear.

8. The 3D printing pen according to claim 1, wherein the pen body further comprises an anti-rotation structure, and the anti-rotation structure is configured to limit the filament passing through the filament feeding channel to limit a rotation of the filament.

9. The 3D printing pen according to claim 1, wherein the stirring mechanism comprises
- a stirring tube configured to feed the filament,
  - wherein the stirring tube is disposed within the pen body; and
- a stirring cavity is disposed within the nozzle, and the stirring tube is communicated with the stirring cavity.

* * * * *